US010355827B2

(12) United States Patent
Kainulainen et al.

(10) Patent No.: US 10,355,827 B2
(45) Date of Patent: Jul. 16, 2019

(54) STATUS REPORTING IN A WIRELESS COMMUNICATION SYSTEM

(71) Applicant: Telefonaktiebolaget LM Ericsson (publ), Stockholm (SE)

(72) Inventors: Jani-Pekka Kainulainen, Kirkkonummi (FI); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/758,821

(22) PCT Filed: Nov. 22, 2017

(86) PCT No.: PCT/SE2017/051342
§ 371 (c)(1),
(2) Date: Mar. 9, 2018

(87) PCT Pub. No.: WO2019/031999
PCT Pub. Date: Feb. 14, 2019

(65) Prior Publication Data
US 2019/0052409 A1   Feb. 14, 2019

Related U.S. Application Data

(60) Provisional application No. 62/542,646, filed on Aug. 8, 2017.

(51) Int. Cl.
*H04L 1/16* (2006.01)
*H04L 5/00* (2006.01)
(Continued)

(52) U.S. Cl.
CPC .......... *H04L 1/1642* (2013.01); *H04L 5/0053* (2013.01); *H04L 5/0055* (2013.01);
(Continued)

(58) Field of Classification Search
CPC ... H04L 1/1642; H04L 5/0055; H04L 47/334; H04W 24/10; H04W 28/065
See application file for complete search history.

(56) References Cited

U.S. PATENT DOCUMENTS

2008/0043619 A1   2/2008  Sammour et al.
2009/0086760 A1*  4/2009  Vedantham ........... H04L 1/1628
                                                          370/474
(Continued)

OTHER PUBLICATIONS

3rd Generation Partnership Project, "Technical Specification Group Radio Access Network; NR; Radio Link Control (RLC) protocol specification (Release 15);" 3GPP TS 38.322 V0.2.0, Jul. 1, 2017, pp. 1-30.

*Primary Examiner* — Duc C Ho
(74) *Attorney, Agent, or Firm* — Murphy, Bilak & Homiller, PLLC

(57) ABSTRACT

Radio equipment (12, 14) is configured for use in a wireless communication system (10). The radio equipment (12, 14) transmits or receives a status report message (18) that includes a negative acknowledgement, NACK, sequence number, SN, field (20) and multiple different sets of segment offset, SO, fields (22-1, . . . 22-N) related to the NACK SN field (20). The different sets of SO fields (22-1, . . . 22-N) may for instance indicate different respective service data unit, SDU, portions that have been detected as lost. These different respective SDU portions may be portions of the same SDU with a SN indicated by the NACK SN field (20).

26 Claims, 28 Drawing Sheets

(51) Int. Cl.
*H04W 24/10* (2009.01)
*H04L 12/801* (2013.01)
*H04W 28/06* (2009.01)

(52) U.S. Cl.
CPC ............ *H04W 24/10* (2013.01); *H04L 47/34* (2013.01); *H04W 28/065* (2013.01)

(56) References Cited

U.S. PATENT DOCUMENTS

| | | | |
|---|---|---|---|
| 2009/0161571 A1* | 6/2009 | Terry | H04L 1/188 370/252 |
| 2011/0041024 A1 | 2/2011 | Burbidge et al. | |
| 2011/0110263 A1* | 5/2011 | Yi | H04L 1/1642 370/252 |
| 2011/0164664 A1 | 7/2011 | Torsner et al. | |
| 2017/0041766 A1* | 2/2017 | Vajapeyam | H04W 80/02 |

* cited by examiner

| D/C | CPT | E1=1 | R | ACK_SN | ACK_SN (cont.) | ACK_SN (cont.) | E1 | E2=1 | E3=1 | R | R | R | NACK_SN 20 | NACK_SN (cont.) | NACK_SN (cont.) | SO-pairs 22 |

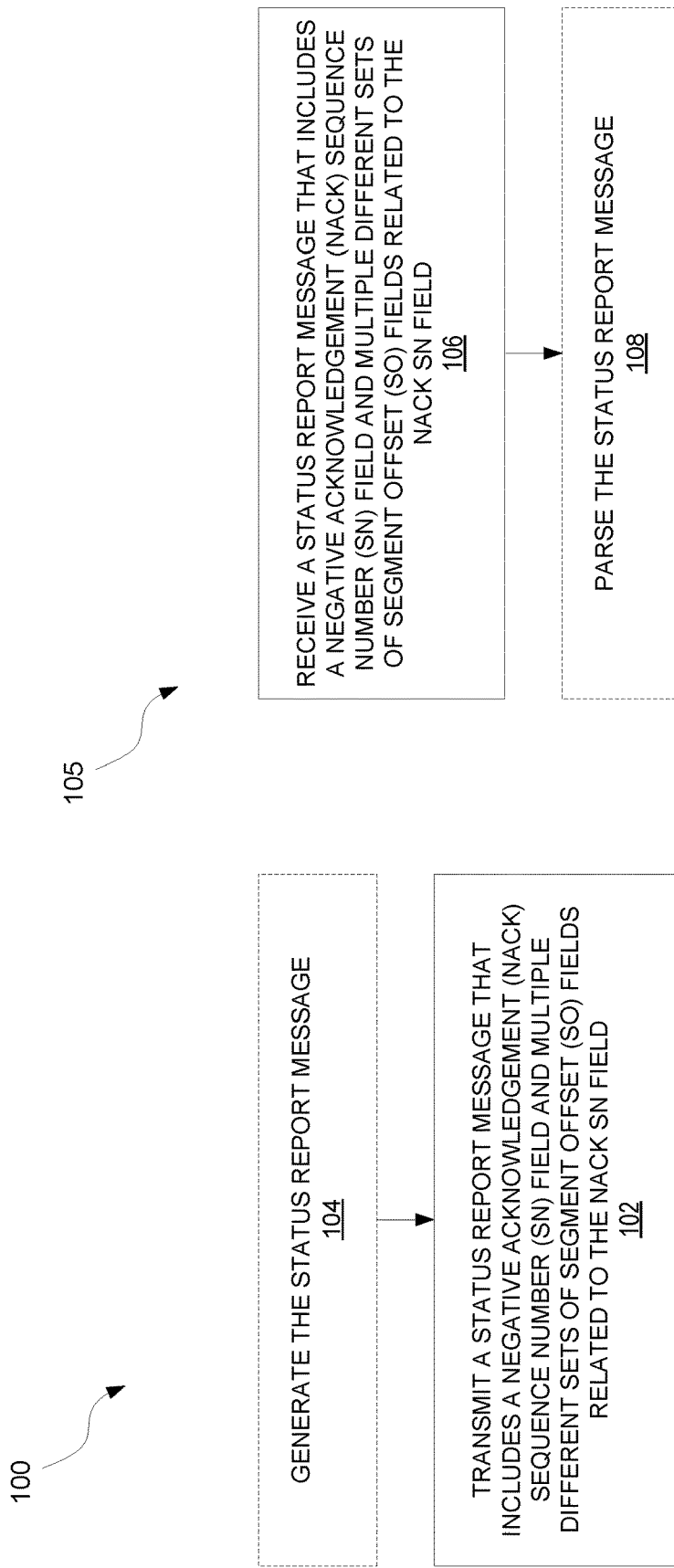

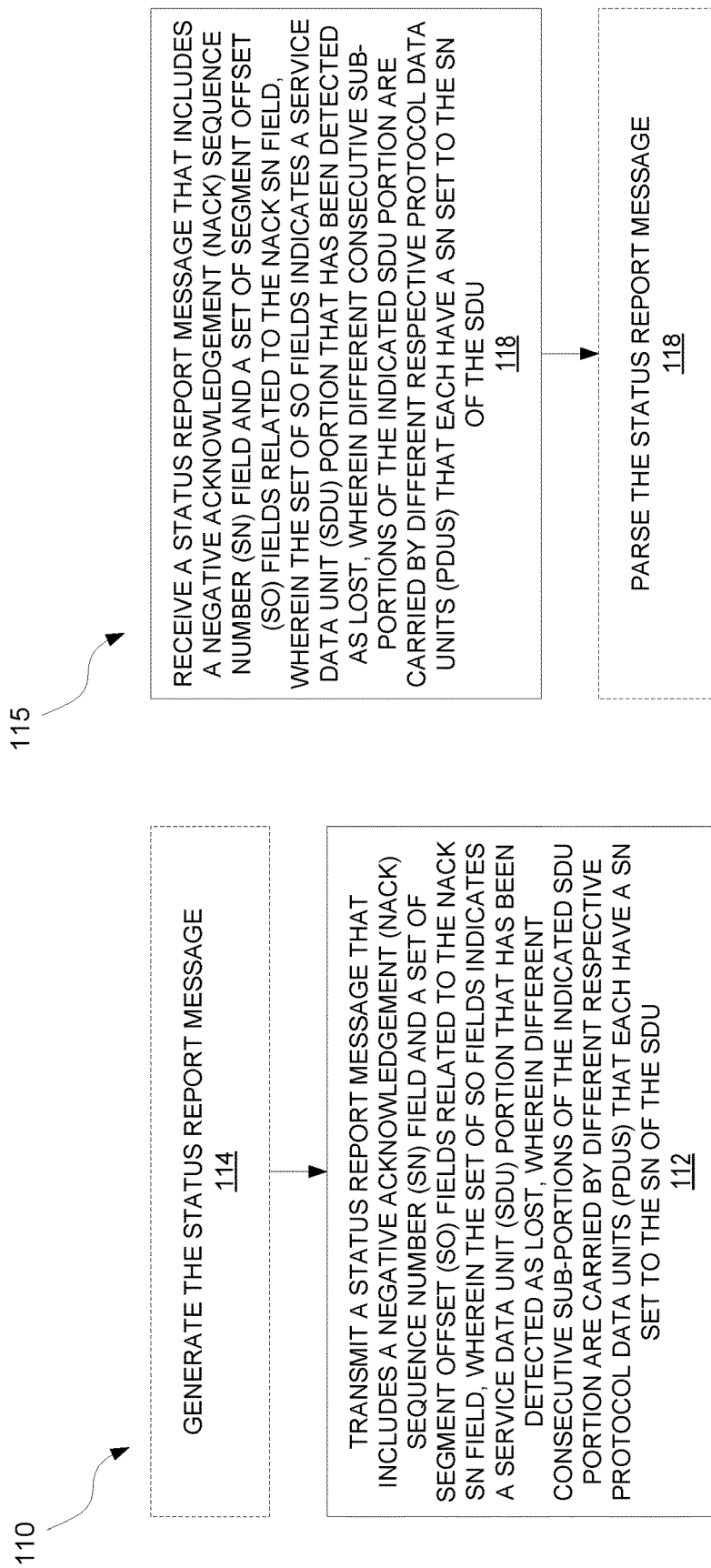

STATUS REPORTING IN A WIRELESS COMMUNICATION SYSTEM

RELATED APPLICATIONS

This application claims priority to U.S. Provisional Patent Application Ser. No. 62/542,646 filed Aug. 8, 2017, the entire contents of which are incorporated herein by reference.

TECHNICAL FIELD

The present application generally relates to a wireless communication system, and particularly relates to status reporting in a wireless communication system.

BACKGROUND

In a wireless communication system, a radio link control (RLC) protocol may be used to convey user plane or control plane information between radio equipments, e.g., between a user equipment (UE) and radio network equipment. At the transmitting radio equipment, an RLC entity receives service data units (SDUs) from a higher layer protocol, e.g., a packet data convergence protocol (PDCP) for user plane information or a radio resource control (RRC) protocol for control plane information. The RLC entity forms RLC protocol data units (PDUs) from the SDUs. In doing so, the RLC entity may segment any given RLC SDU into multiple portions or segments such that different RLC PDUs contain different portions or segments of the same RLC SDU. The RLC entity then sends the RLC PDUs to a lower layer protocol, for transfer to a peer RLC entity at the receiving radio equipment. The peer RLC entity may re-assemble the received RLC PDUs into RLC SDUs, taking into account any segmentation performed at the transmitting end.

In some cases, such as when information transfer is performed in an acknowledged mode (AM), the RLC protocol uses re-transmissions to guarantee lossless information delivery. To accomplish this, the peer RLC entity at the receiving side must send status reports to the RLC entity at the transmitting side indicating what information was lost and needs to be re-transmitted. However, providing these status reports for the RLC protocol or other protocols may prove complicated in some contexts that threaten to increase status report size and the corresponding overhead associated with re-transmissions.

SUMMARY

Some embodiments herein provide a status report that indicates multiple portions or segments of the same SDU have been detected as lost. Some embodiments may do so efficiently even in contexts for example where the multiple portions or segments of the SDU are not distinguishable by sequence numbers (SNs) of the PDUs in which they are contained, e.g., in contexts where the SN of each PDU is set to the SN of its corresponding SDU. In some embodiments, for instance, a status report message includes multiple different sets of segment offset (SO) fields that are related to the same negative acknowledge (NACK) SN field. In these and other embodiments, the size of the status report message may be reduced, e.g., as compared to a status report message that requires different sets of SO fields to be related to different NACK SN fields.

More particularly, embodiments herein include a method performed by radio equipment configured for use in a wireless communication system. The method comprises transmitting or receiving a status report message that includes a negative acknowledgement (NACK) sequence number (SN) field and multiple different sets of segment offset (SO) fields related to the NACK SN field. The different sets of SO fields may for instance indicate different respective service data unit (SDU) portions that have been detected as lost. These different respective SDU portions may be portions of the same SDU with a SN indicated by the NACK SN field.

In some embodiments, the method further comprises detecting the different SDU portions as lost at the radio equipment, and performing said transmitting of the status report message in response to said detecting. In other embodiments, the method further comprises transmitting the different respective SDU portions in different respective protocol data units (PDUs) that each have a SN set to the SN of the SDU, and receiving the status report message in response to transmitting at least some of the different respective SDU portions.

In any of the embodiments, the status report message may be configurable to include one status report block per SDU to be negatively acknowledged by the status report message, in whole or in part, such that different status report blocks negatively acknowledge different SDUs. Alternatively or additionally, the NACK SN field and the multiple different sets of SO fields related to the NACK SN field may be included in the same status report block.

In some embodiments, the status report message further includes a count field indicating how many sets of SO fields are related to the NACK SN field. Alternatively, in some embodiments, the status report message further includes an extension bit before each set of SO fields indicating whether or not another set of SO fields is included in the status report message after that set of SO fields. In yet other alternative embodiments, the status report message further includes an extension bit after each set of SO fields indicating whether or not another set of SO fields is included in the status report message after that set of SO fields. In still other alternatives, the status report message further includes a NACK range field, wherein according to a first possible format of the status report message the NACK range field indicates a number of consecutively lost SDUs starting from and including an SDU indicated by the NACK SN field, and wherein according to a second possible format of the status report message the NACK range field indicates a number of sets of SO fields related to the NACK SN field.

In any of the embodiments, the status report message may further include a set of one or more extension bits that indicates the status report message includes multiple different sets of SO fields related to the NACK SN field.

In some embodiments, for at least one of the sets of SO fields, different sub-portions of the SDU portion indicated by that set of SO fields are carried by different respective protocol data units (PDUs) that each have a SN set to the SN of the SDU.

In some embodiments, the status report message is a radio link control (RLC) status report, and the SDU is a RLC SDU.

In some embodiments, the radio equipment is a user equipment. In other embodiments, the radio equipment is radio network equipment.

Embodiments also include corresponding apparatus, computer programs, and carriers such as non-transitory computer readable mediums.

For example, embodiments include radio equipment configured for use in a wireless communication system. The radio equipment is configured to transmit or receive a status report message that includes a negative acknowledgement (NACK) sequence number (SN) field and multiple different sets of segment offset (SO) fields related to the NACK SN field. The different sets of SO fields may for instance indicate different respective service data unit (SDU) portions that have been detected as lost. These different respective SDU portions may be portions of the same SDU with a SN indicated by the NACK SN field.

Embodiments also include radio equipment configured for use in a wireless communication system. The radio equipment comprises radio circuitry and processing circuitry. The processing circuitry is configured to transmit or receive, via the radio circuitry, a status report message that includes a negative acknowledgement (NACK) sequence number (SN) field and multiple different sets of segment offset (SO) fields related to the NACK SN field. The different sets of SO fields may for instance indicate different respective service data unit (SDU) portions that have been detected as lost. These different respective SDU portions may be portions of the same SDU with a SN indicated by the NACK SN field.

BRIEF DESCRIPTION OF THE DRAWINGS

FIG. 10 is a block diagram of a status report message with extension bits indicating multiple sets of segment offset fields according to some embodiments.

FIG. 11 is a block diagram of a status report message with a new extension bit indicating multiple sets of segment offset fields according to some embodiments.

FIG. 17A is a logic flow diagram of a method performed by radio equipment according to some embodiments.

FIG. 17B is a logic flow diagram of a method performed by radio equipment according to other embodiments.

FIG. 17C is a logic flow diagram of a method performed by radio equipment according to still other embodiments.

FIG. 17D is a logic flow diagram of a method performed by radio equipment according to yet other embodiments.

DETAILED DESCRIPTION

Figure 1:
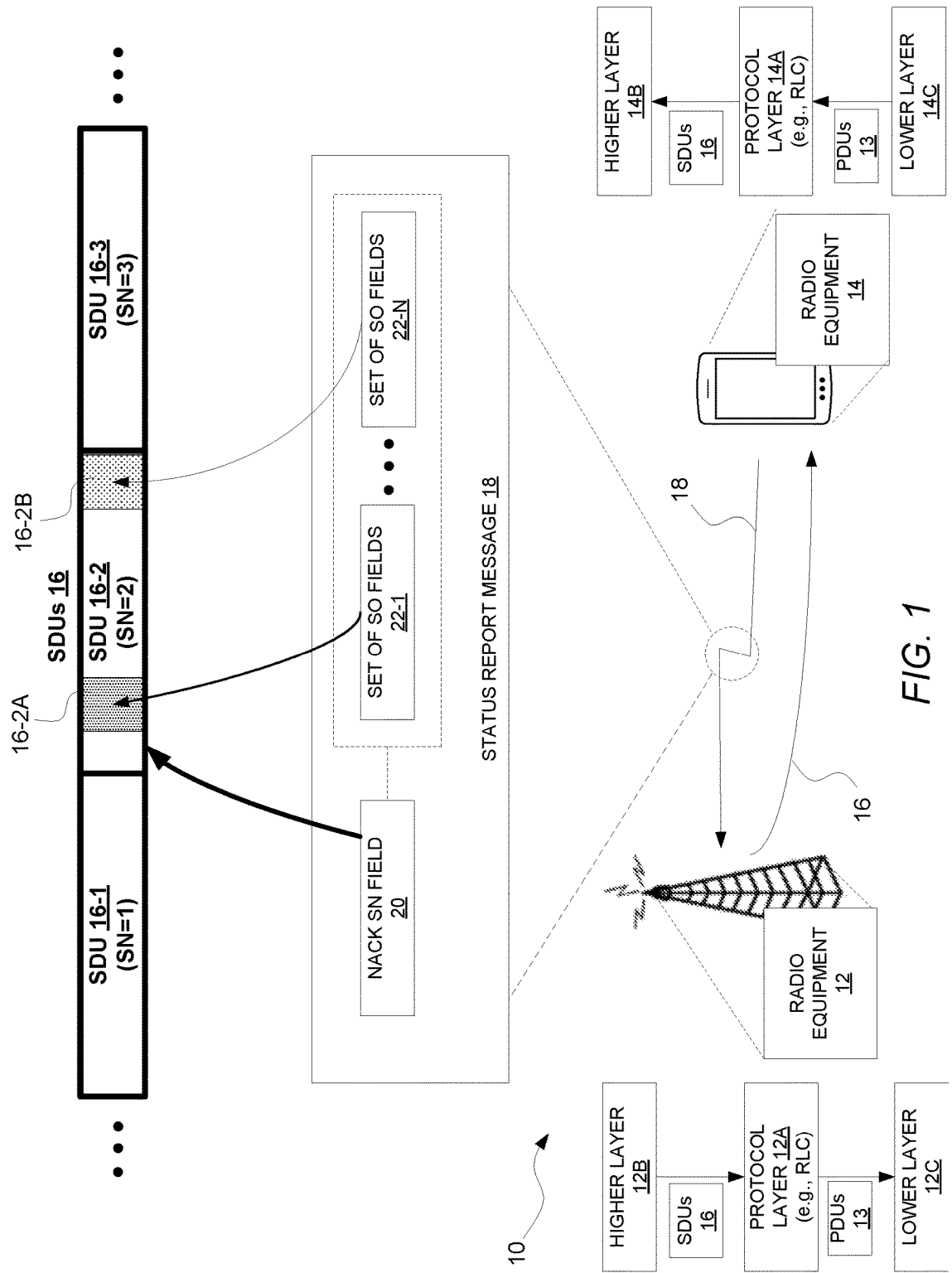
FIG. 1 is a block diagram of a wireless communication system according to some embodiments.

FIG. 1 illustrates a wireless communication system 10 according to some embodiments (e.g., a 5$^{th}$ Generation system, a New Radio system, or the like). The system 10 includes radio equipment 12, 14. FIG. 1 for instance shows radio equipment 12 in the form of radio network equipment (e.g., a base station) and radio equipment 14 in the form of a user equipment (UE).

Irrespective of their particular form, though, radio equipment 12 is configured to transmit service data units (SDUs) 16 to radio equipment 14, e.g., from the perspective of a particular protocol layer at the radio equipments 12, 14. As shown in FIG. 1 for instance, a particular protocol layer 12A (e.g., radio link control, RLC) at radio equipment 12 receives the SDUs 16 from a higher protocol layer 12B and sends those SDUs 16 as included in protocol data units (PDUs) 13 towards a lower protocol layer 12C for transmission to radio equipment 14. Any given SDU 16 may be transmitted in a single PDU 13 or across multiple different PDUs 13 that contain different portions or segments of that SDU 16. A protocol layer 14A at radio equipment 14 is correspondingly configured to receive the SDUs 16 as included in PDUs 13 from a lower protocol layer 14C. The protocol layer 14A in particular may re-assemble the PDUs 13 received from the lower protocol layer 14C into SDUs 16, and deliver those SDUs 16 to a higher protocol layer 14B at radio equipment 14.

Regardless, the SDUs 16 each have a sequence number (SN) which may for instance indicate an order in which the SDUs 16 are transmitted in sequence. FIG. 1 in this regard shows an example where SDUs 16-1, 16-2, and 16-3 are transmitted in that order, with SDU 16-1 having an SN equal to 1, SDU 16-2 having an SN equal to 2, and with SDU 16-3 having an SN equal to 3.

Radio equipment 14 is configured to correspondingly transmit a status report message 18, e.g., as part of acknowledgement feedback to radio equipment 12. Radio equipment 12 is in turn configured to receive such a status report message 18. The status report message 18 in particular includes a negative acknowledgement (NACK) SN field 20. The status report message 18 also advantageously includes multiple different sets of segment offset (SO) fields 22-1, . . . 22-N related to the NACK SN field 20. That is, each of the multiple different sets of SO fields 22-1, . . . 22-N are related to the same NACK SN field 20, not different NACK SN fields.

The NACK SN field 20 in some embodiments indicates an SN of an SDU that has been detected by radio equipment 14 as at least partially lost, i.e., negatively acknowledged. The NACK SN field 20 by itself may thereby just indiscriminately indicate that either the whole SDU with the indicated SN has been lost or, if that SDU has been segmented, one or more portions or segments of the SDU with the indicated SN has been lost. Note in this regard that the NACK SN field 20 indicates an SN of an SDU, as opposed to an SN of a PDU that may contain all or part of that SDU, so as to perform negative acknowledgement on an SDU by SDU basis rather than on a PDU by PDU basis. In fact, in some embodiments, each PDU has an SN set to the SN of its corresponding SDU. In this case, where a given SDU is segmented into multiple different portions or segments for inclusion in different respective PDUs, each of those PDUs would have the same SN (namely, the SN of the given SDU), such that SNs by themselves prove insufficient for negatively acknowledging certain portions or segments of an SDU. This in turn means that the NACK SN field 20 by itself proves insufficient for negatively acknowledging certain portions or segments of an SDU.

Accordingly, in some embodiments, each set of SO fields 22-1, . . . 22-N complements the NACK SN field 20 by indicating a certain SDU portion or segment that has been detected as lost. Each set of SO fields 22-1, . . . 22-N may include for instance an SO start field that identifies the start of a certain SDU portion or segment (e.g., in terms of bytes) and an SO end field that identifies the end of that certain SDU portion or segment (e.g., in terms of bytes). The multiple different sets of SO fields 22-1, . . . 2-N thereby indicate multiple different respective SDU portions or segments that have been detected as lost. Notably, the different respective SDU portions or segments indicated by the different sets of SO fields 22-1, . . . 22-N are portions or segments of the same SDU; namely, the SDU with the SN indicated by the NACK SN field 20. The multiple different sets of SO fields 22-1, . . . 22-N may therefore each be related to the NACK SN field 20 in the sense that the SDU portion or segment identified by each set of SO fields is a portion or segment of the SDU with an SN indicated by the NACK SN field 20. The NACK SN field 20 then may in some sense be shared by or common to each of multiple sets of SO fields 22-1, . . . 22-N.

FIG. 1 for example shows that radio equipment 14 may generate the status report message 18 so that the NACK SN field 20 has a value of "2" in order to identify SDU 16-2 (which has SN equal to 2) as at least partially lost. Radio equipment 14 may also generate the status report message 18 to include multiple sets of SO fields related to that NACK SN field 20, in order to indicate that multiple portions or segments 16-2A, 16-2B of SDU 16-2 have been detected as lost. FIG. 1 in this regard shows the message 18 as including one set of SO fields 22-1 indicating one portion or segment 16-2A of SDU 16-2 as lost, and another set of SO fields 22-N indicating a different portion or segment 16-2B of SDU 16-2 as lost.

With multiple sets of SO fields related to the same NACK SN field, the size of the status report message 18 may be reduced, e.g., as compared to a status report message that requires different sets of SO fields to be related to different NACK SN fields. This may correspondingly optimize status reporting overhead and improve system performance, especially for instance in contexts where PDU SNs are set to their corresponding SDU SNs.

Note that, although FIG. 1 shows an instance where multiple SO field sets 22-1, . . . 22-N are related to the same NACK SN field 20, the status report message 18 in some embodiments may be configurable so that any number of SO field sets may be related to that same NACK SN field 20, i.e., one or more. Accordingly, in some embodiments, the status report message 18 may generally indicate whether multiple sets of SO fields are related to the NACK SN field 20 (e.g., without more specifically indicating how many sets of SO fields are related to the NACK SN field 20). In one embodiment, for instance, the status report message 18 further includes a set of one or more extension bits that indicates the status report message 18 includes multiple different sets of SO fields related to the NACK SN field 20.

In other embodiments, though, the status report message 18 may effectively indicate how many sets of SO fields are related to the NACK SN field 20, e.g., to assist with message parsing. In one embodiment, for instance, the status report message 18 further includes a count field indicating how many sets of SO fields are related to the NACK SN field 20. Alternatively, the status report message 18 may include an extension bit before each set of SO fields indicating whether or not another set of SO fields is included in the status report message 18 after that set of SO fields, e.g., so that collectively the extension bits indicate how many sets of SO fields are related to the NACK SN field 20. In still other embodiments, the status report message 18 further includes an extension bit after each set of SO fields indicating whether or not another set of SO fields is included in the status report message 18 after that set of SO fields. In yet other embodiments, the status report message further includes a NACK range field. In this case, according to a first possible format of the status report message 18 the NACK range field indicates a number of consecutively lost SDUs starting from and including an SDU indicated by the NACK SN field 20. But according to a second possible format of the status report message 18 the NACK range field indicates a number of sets of SO fields related to the NACK SN field 20.

Note also that although FIG. 1 focused on the status report message 18 negatively acknowledging multiple portions of a certain SDU, the same status report message 18 in some embodiments may also negatively acknowledge one or more other SDUs, in whole or in part. In this case, then, the status report message 18 may include multiple NACK SN fields, with one or more SO field sets related to each respective NACK SN field.

Figure 2:
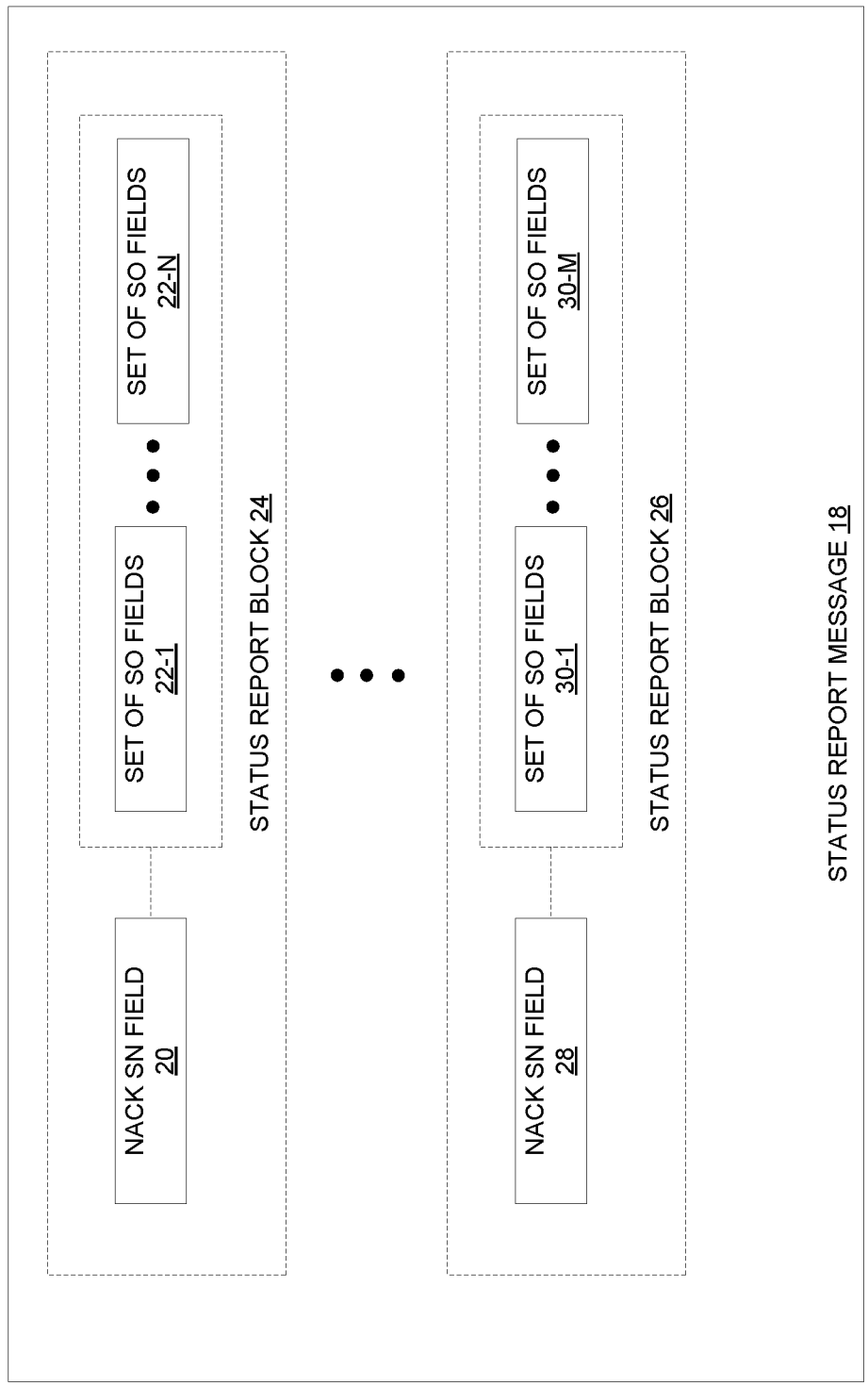
FIG. 2 is a block diagram of a status report message according to some embodiments.

In one embodiment, for instance, the status report message 18 is configurable to include one so-called status report block per SDU to be negatively acknowledged, in whole or in part, by the status report message 18, i.e., such that different status report blocks negatively acknowledge different SDUs 16. In this and other embodiments, therefore, the NACK SN field 20 and the multiple sets of SO fields 22-1, . . . 22-N related to that NACK SN field 20 may be included in the same status report block. Where the same status report message 18 negatively acknowledges one or more other SDUs, in whole or in part, the message 18 may correspondingly include one or more other status report blocks. Each status report block that negatively acknowledges multiple portions or segments of an SDU may include its own NACK SN field and multiple sets of SO fields related to that NACK SN field. FIG. 2 shows one example in this regard.

As shown in FIG. 2, the status report message 18 includes a status report block 24 that includes the NACK SN field 20 and the multiple different sets of SO fields 22-1, . . . 22-N related to that NACK SN field 20. The status report message 18 however also includes one or more additional status report blocks, one of which is shown as status report block 26. This block 26 may include a different NACK SN field 28 and multiple different sets of SO fields 30-1, . . . 30-M related to that different NACK SN field.

Note further that although FIG. 1 illustrated radio equipment 12 as transmitting SDUs 16 to radio equipment 14, and radio equipment 14 transmitting the status report message 18 to radio equipment 12 in response, embodiments herein may alternatively or additionally apply in the opposite direction. That is, although not shown, radio equipment 14 may transmit SDUs 16 to radio equipment 12, and radio equipment 12 may transmit the status report message 18 to radio equipment 14 in response.

Some embodiments will now be described in a certain context where the SDUs 16 are RLC SDUs. An RLC transmitter and RLC receiver exchange information about the sent and received PDUs. A status report format is used in legacy systems to collect information about received and missing PDUs between RLC transmitter and receiver entity. A status report may be triggered for different reasons. The most common reason to send a status report is when the receiver gets an RLC header including a poll bit. The poll bit is set by the RLC transmitter. When the RLC receiver notices the poll-bit in the RLC header, it will send an RLC status report, describing the state of the receiver window to the RLC transmitter entity.

In Long Term Evolution (LTE) embodiments, when an RLC SDU needs to be segmented to be transmitted, each associated RLC PDU (containing part of the RLC SDU) is created and contains its own Sequence Number (SN). For New Radio (NR) embodiments, by contrast, one RLC SDU may only have one Sequence Number, i.e., each PDU containing at least a portion of that RLC SDU will have the SN of the SDU. This means that segments associated with the RLC SDU will have the same sequence number. In segmentation, the SDU is split into segments and a SO (segment offset) field is used to indicate the position of the segment from the original SDU, e.g., in bytes within the original SDU. The Framing Info (FI) field (also referred to as a segmentation info (SI) field) indicates whether an RLC PDU contains the first, middle, or last segment of an RLC SDU. The transmitter's segmentation function adds this information into the RLC PDU and the receiver will craft the original SDU based on the information in the RLC PDU.

Figure 3:
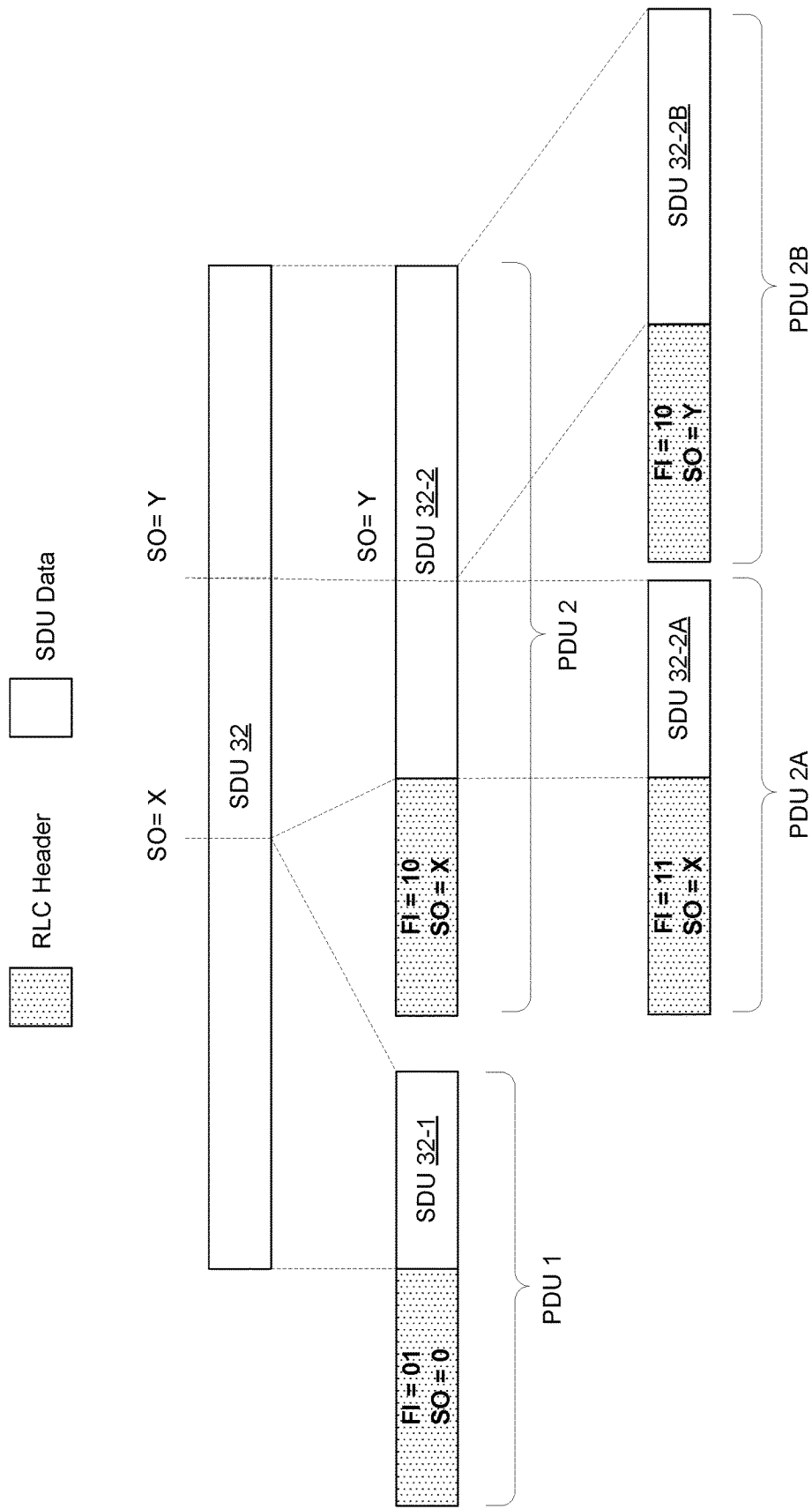
FIG. 3 is a block diagram of SDU segmentation according to some embodiments.

This NR segmentation behavior is illustrated with an example in FIG. 3. As shown, an RLC SDU 32 is first segmented at position X into two segments 32-1 and 32-2. RLC header information may be added to each segment 32-1 and 32-2 to form RLC PDUs 1 and 2. For example, the SO field of PDU 1's header may be set to 0 to indicate that SDU segment 32-1 starts at byte 0 within SDU 32, and the SO field of PDU 2's header may be set to X to indicate that SDU segment 32-2 stars at byte X within SDU 32. And the FI field of the PDU 1's header may be set to "01" to indicate that the SDU segment 32-1 is formed from the beginning of SDU 32, whereas the FI field of PDU 2's header may be set to "10" to indicate that SDU segment 32-2 is formed from the end of the SDU 32.

In some embodiments, though, segmenting SDU 32 at only position X may produce an RLC PDU that is still too large. In this case, FIG. 3 shows that SDU segment 32-2 may be re-segmented at position Y into two further segments 32-2A and 32-2B. RLC header information may correspondingly be added to each segment 32-2A and 32-2B to form RLC PDUs 2A and 2B, in place of RLC PDU 2. For example, the SO field of PDU 2A's header may be set to X to indicate that SDU segment 32-2A starts at byte X within SDU 32, and the SO field of PDU 2's header may be set to Y to indicate that SDU segment 32-2B stars at byte Y within SDU 32. And the FI field of the PDU 2 A's header may be set to "11" to indicate that the SDU segment 32-1A is formed from a middle part of SDU 32, whereas the FI field of PDU 2 B's header may be set to "10" to indicate that SDU segment 32-2B is formed from the end of the SDU 32.

Figure 4:
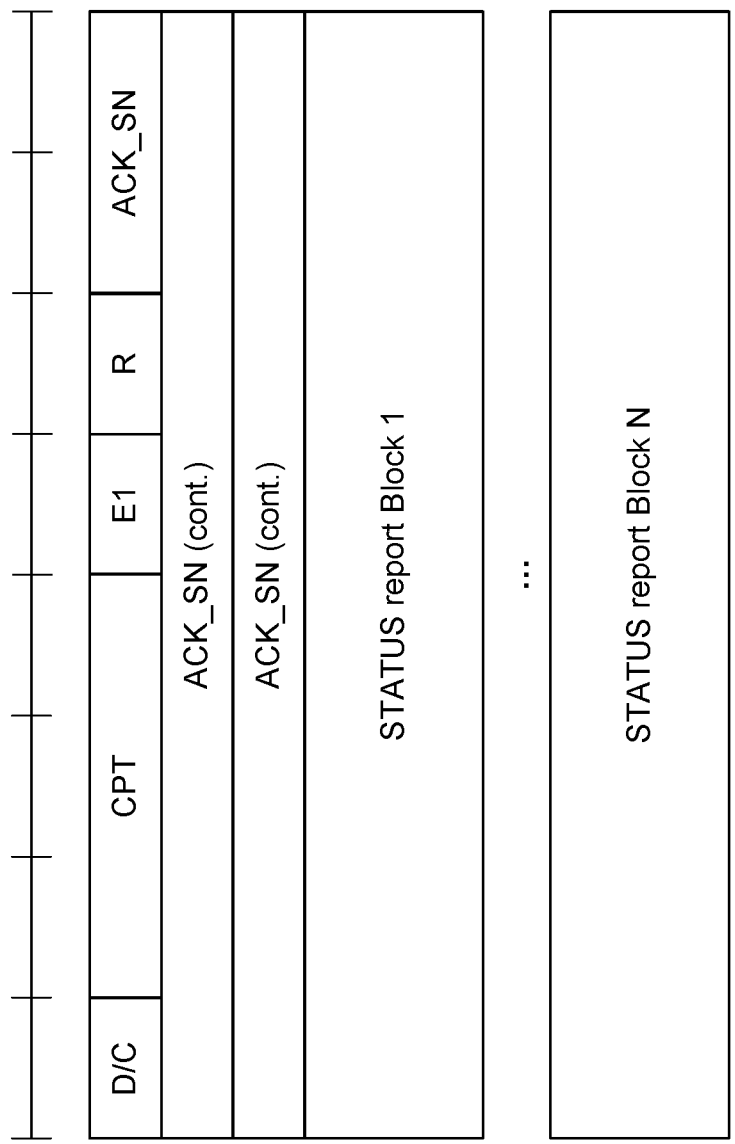
FIG. 4 is a block diagram of a status report message according to some embodiments.

Heretofore, the NR status report format consists of two part parts: a static part comprised of one static block, and a dynamic part comprised of zero, one or more status report blocks. As shown in FIG. 4, the static part contains a data or control (D/C)-field, a control PDU type (CPT) field, an extension 1 (E1)-bit, and a last acknowledged SN, which indicates to the receiver which was the last successfully received SDU SN. The E1-bit indicates the presence of additional data, in this context called status report block. This status report block is comprised of at least two elements: a set of E-bits, and a NACK_SN. The NACK_SN field indicates the SN of an RLC SDU that is negatively acknowledged, in whole or in part, by the status report block. Depending on the value of the set of E-bits, further additional data is included in the status report block. This additional data complements the NACK_SN. This data is a NACK range and a SO pair (SOstart and SOend). The set of E-bits in this status report block may also indicate the presence of a second "status report block".

Based on the information provided in the status report format, the transmitter is able to send the missing data to the receiver, which again allows receiver to move receiver window.

As indicated above, the presence of a "status report block" and the content that the "status report block" contains depends on the value of the E-bits. A set of three E-bits: E1 field, E2 field, and E3 field, and their meanings are as follows.

Figure 5:
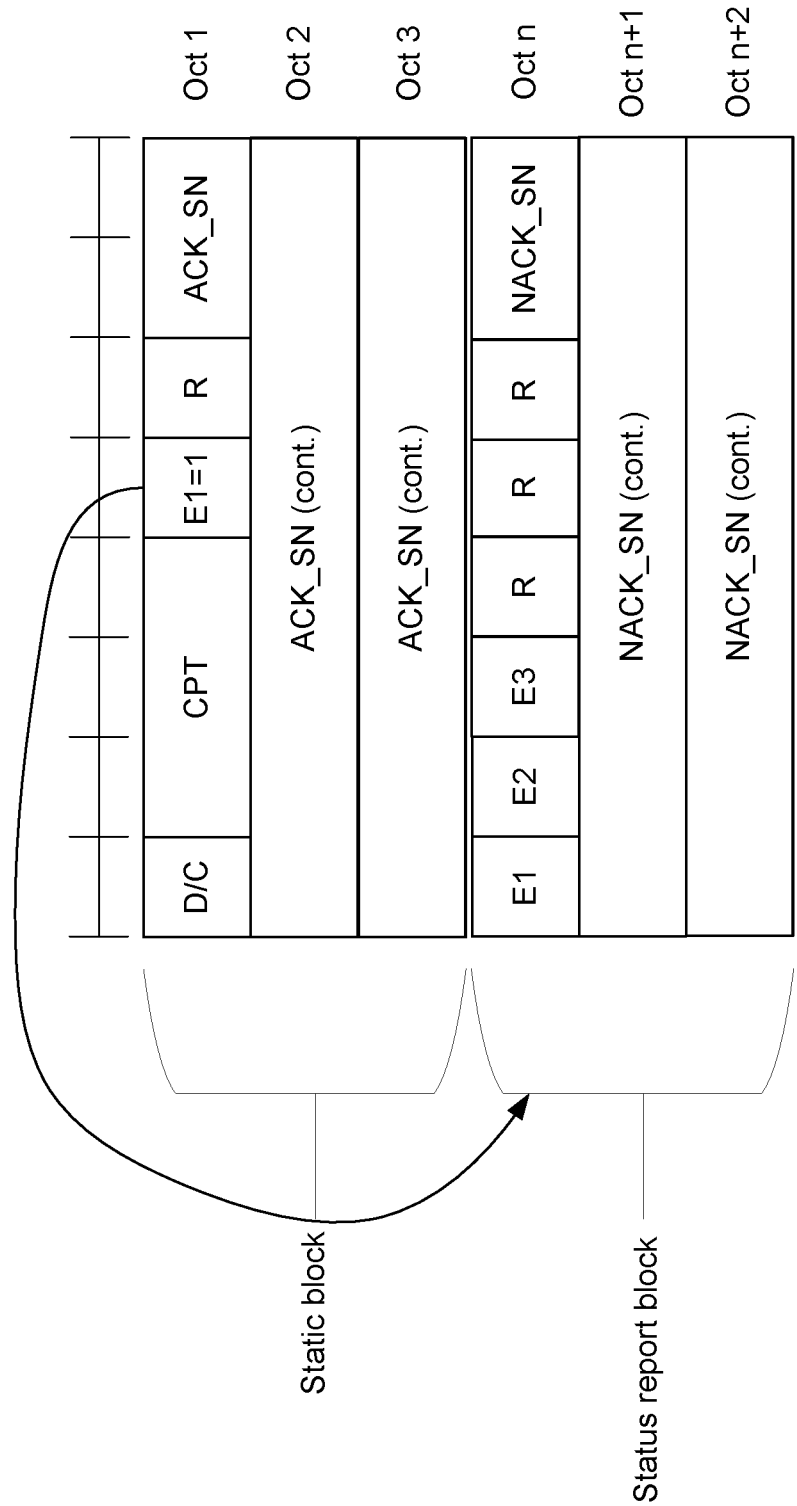
FIG. 5 is a block diagram of a status report message according to some embodiments.

The E1 field indicates either if (E1=1) a status report block containing an E-bit set, and a NACK_SN is included following after this block, or if (E1=0) there are not more status report blocks. As shown in FIG. 5, for example, the first E1-bit is indicating that status report block will follow after ACK_SN.

Figure 6:
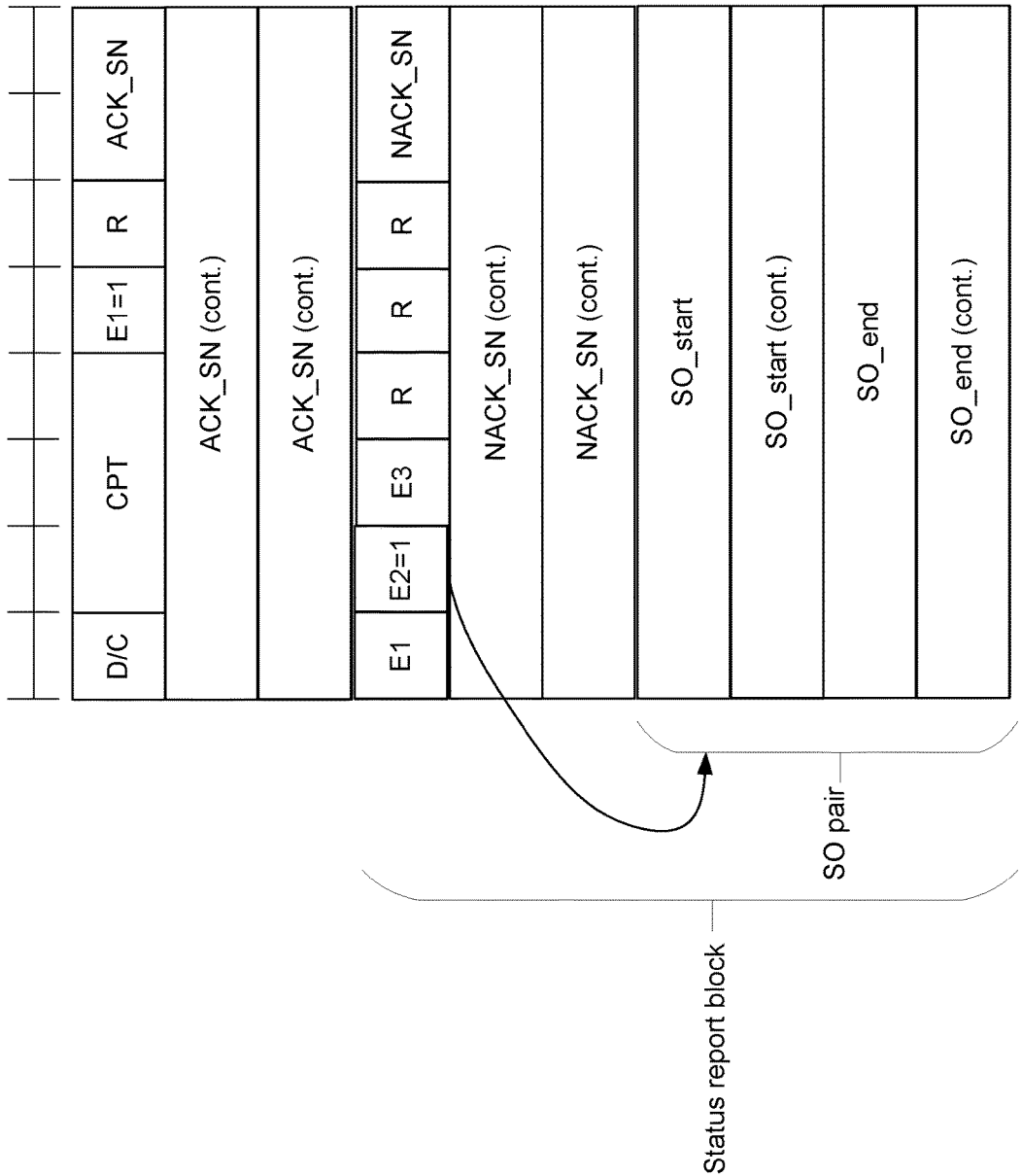
FIG. 6 is a block diagram of a status report message with a set of segment offset fields according to some embodiments.

The E2 field indicates either (E2=1) if a segment of an RLC SDU identified by the NACK_SN in that status report block is missing or (E2=0) if no SO pair is included in this status report block. The missing segment is defined by a SO pair, two fields, a SOstart, and a SOend. The SOstart field together with the SOend field indicates the portion of the RLC SDU with SN=NACK_SN (the NACK_SN for which the SOstart is related to) that has been detected as lost at the receiver. The SOstart field indicates the position of the first byte of the portion of the RLC SDU in bytes within the original RLC SDU, and the SOend field indicates the position of the last byte of the portion of the RLC SDU in bytes within the original RLC SDU. As shown in FIG. 6, for example, the E2-bit indicates that SO_START and SO_END (Segment Offset pair) fields are following in the current status report block.

Figure 7:
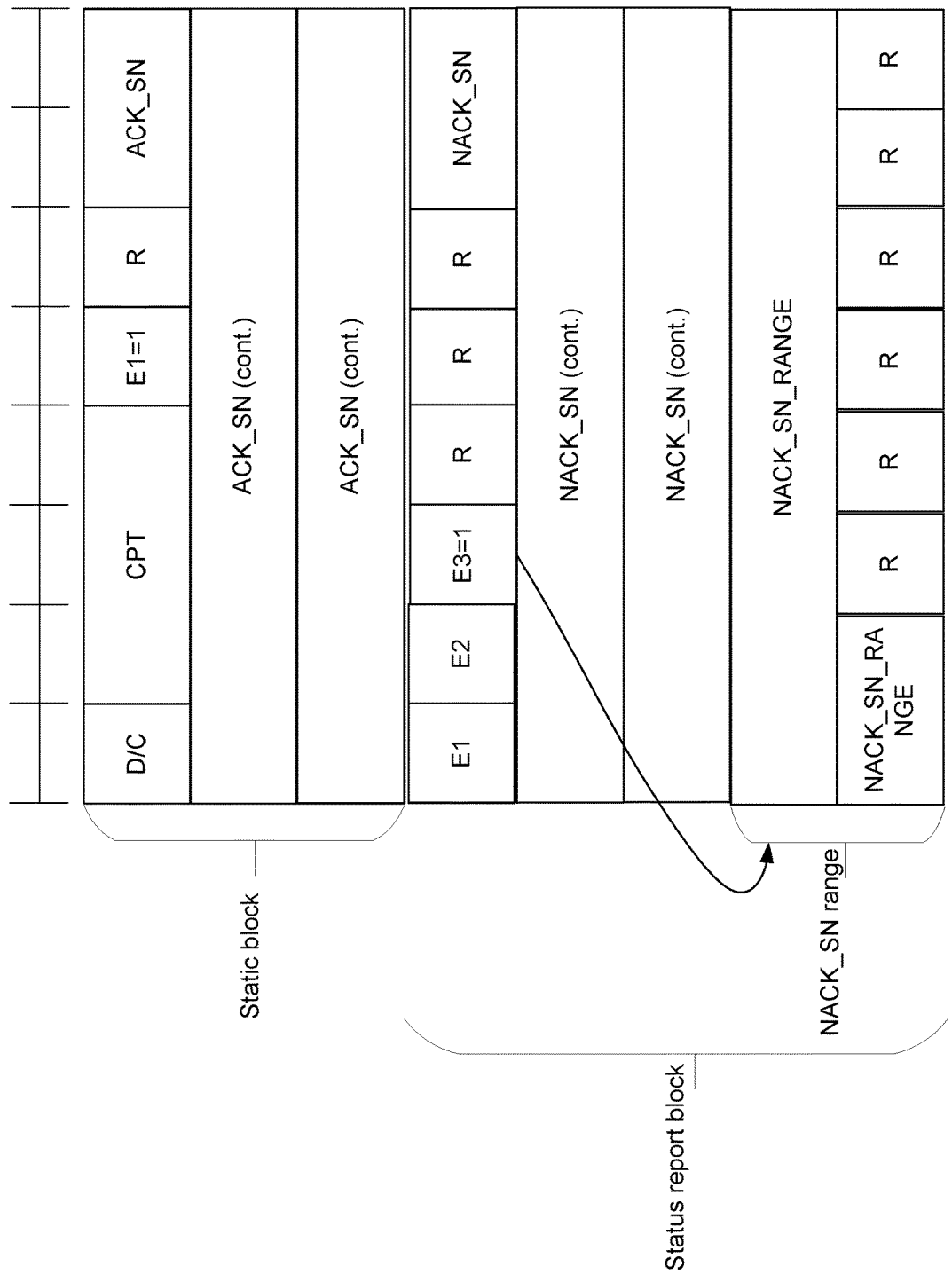
FIG. 7 is a block diagram of a status report message with a NACK SN range field according to some embodiments.

The E3 field indicates either (E3=1) if the status report block contains a NACK range in which the first missing SN is indicated as well as the number the number of consecutively lost RLC SNs, or (E3=0) if the NACK range is not included. In particular, the NACK_SN_RANGE field indicates a number of consecutively lost RLC SNs starting from and including NACK_SN that have not been received. As shown in FIG. 7, for example, the E3 bit indicates that the NACK_SN_RANGE will follow.

Accordingly, in some embodiments, when constructing a status report, the receiver may include in the report different fields depending on how much of an RLC SDU has been received. For an RLC SDU for which no byte segments have been received yet, the receiver shall include in the status report a NACK_SN which is set to the SN of the RLC SDU. For a continuous sequence of byte segments of a partly received RLC SDU that have not been received yet, the receiver shall include in the status report a set of NACK_SN, SOstart, and SOend. The receiver shall also set the ACK_SN to the SN of the next not received RLC SDU which is not indicated as missing in the resulting status report. When the transmitter receives a status report (e.g., STATUS PDU), it interprets that all RLC SDUs up to but not including the RLC SDU with SN=ACK_SN have been received by the receiver, excluding those RLC SDUs indicated in the status report with NACK_SN, portions of RLC SDUs indicated in the status report with NACK_SN, SOstart and SOend, RLC SDUs indicated in the status report with NACK_SN and NACK_range, and portions of RLC SDUs indicated in the status report with NACK_SN, NACK range, SOstart and SOend.

Figure 8:
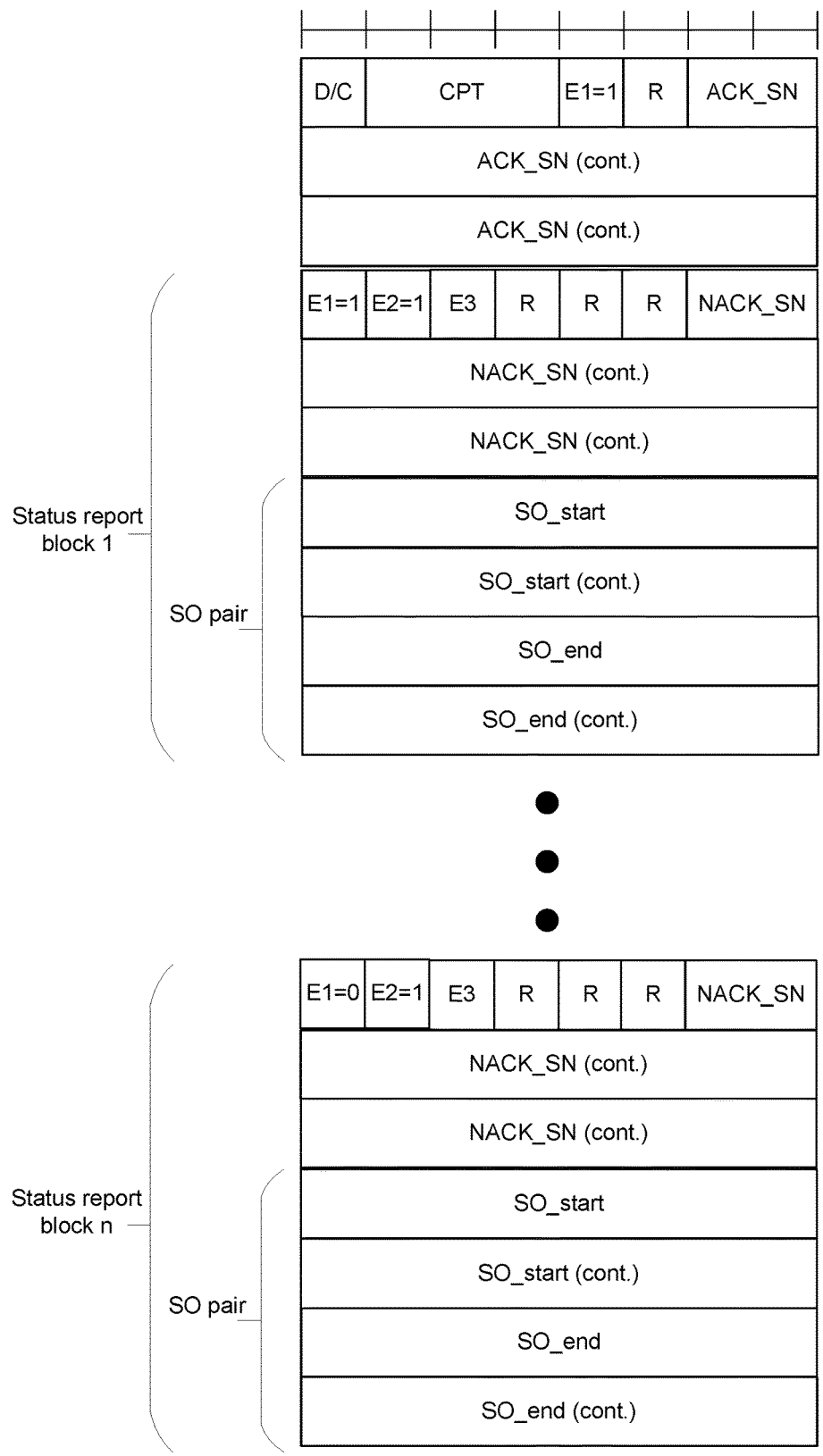
FIG. 8 is a block diagram of a status report message with multiple sets of segment offset fields according to some embodiments.

The status report format used heretofore as described in FIGS. 4-7 may prove susceptible to increased size under some circumstances. For example, an RLC SDU may be segmented and a number of RLC PDUs may be created to transmit the RLC SDU. There may be cases in which multiple (e.g., few) segments of that RLC SDU are lost. If the receiver were to indicate for each SO pair (i.e. for each segment) the SN and the E-bit set, as shown in FIG. 8, the size of the status report message would increase considerably.

More particularly, consider a situation where a transmitter segments an SDU and sends the segments as PDUs 1-8 to the receiver but the receiver receives only PDUs 1,4, 6 and 8. The transmitter sets the poll-bit based on timer expiration or counter value, which exceeds the pre-configured value. This results in that the receiver must create a status report to be sent to the transmitter. If the receiver were to indicate for each SO pair (i.e. for each segment) the SN and the E-bit set, the status report would include a number of status report blocks in which, each of them, would contain a NACK_SN and a SO-pair, i.e., because the receiver has multiple missing PDUs. This would remain the case even though those multiple missing PDUs have the same SN (because these RLC PDUs are associated to the same RLC SDU).

From an overhead perspective, it would not be efficient to include independent status reports blocks in which each of them contains the same NACK_SN and different SO pairs.

Accordingly, one or more embodiments herein include an RLC status report format that uses the same NACK_SN for segments of a given RLC SDU. When the status report indicates a number of segments (RLC PDUs) belonging to one RLC SDU, the status report only contains once the NACK_SN, and all the SO pairs missing for the given RLC SDU. The receiver (e.g., UE) indicates this format by using one of the E-bits, a combination of the E-bits, or other bits.

Embodiments thereby include a method to indicate multiple missing SDU segments with one Sequence Number (field). This can be done by using solutions that are based on E-bit interpretation, adding new Extension bit(s), or by using COUNT to indicate a number of Segmentation gaps in an SDU. In some embodiments, an SO pair indicates multiple consecutively missing PDUs.

According to some embodiments, advantages include that over the air overhead is saved. Alternatively or additionally, there can be cases when the receiver (e.g., UE) does not need an additional grant to send the status report format, as it may fit all the information into a status report format that has reduced size. This reduces signaling between the receiver and the transmitter (e.g., UE and gNB). Alternatively or additionally, some embodiments improve over the air overhead because SN, which has size of 12 or 18 bits in some embodiments, is sent only once. As the number of missing segments in SDU increases, more overhead is saved.

In order to overcome the above described problem of status report overhead, the receiver may create a status report block which uses the same NACK_SN and multiple SO-pairs to indicate multiple RLC PDUs which are associated to the same RLC SDU (which is identified by the NACK_SN). Combining many SO pairs under the same NACK_SN is possible in some embodiments (e.g., in the NR system) where SN is assigned per SDU. Thus, all of the segments of one SDU will use the same SN.

Figure 9A:
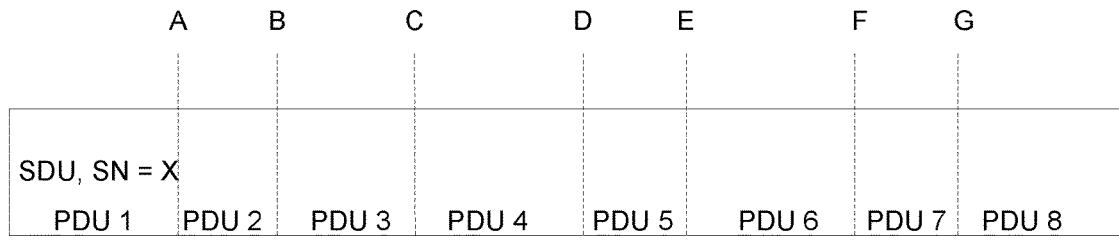
FIG. 9A is a block diagram of an SDU segmented according to an example.
Figure 9B:
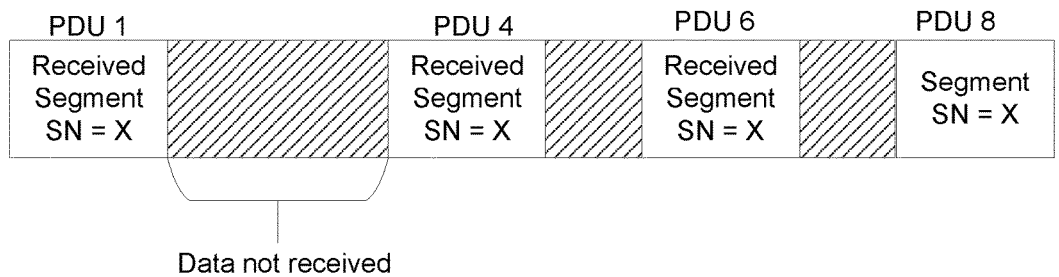
FIG. 9B is a block diagram of the SDU in FIG. 9A from the perspective of a receiver in which some PDUs are missing.
Figure 9C:
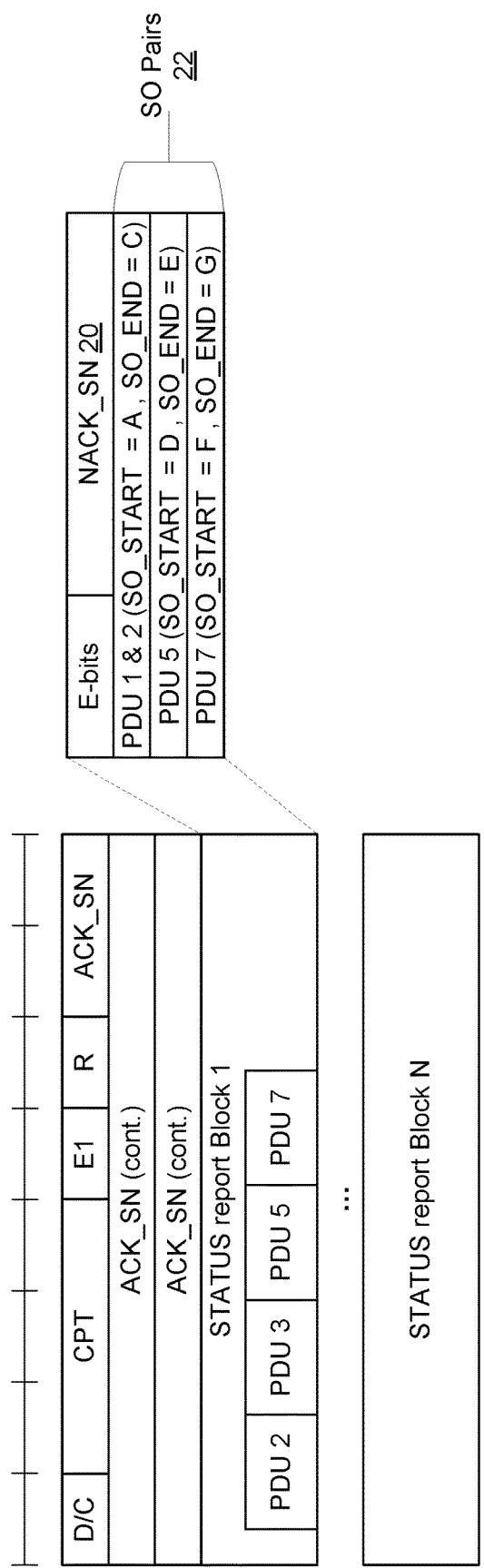
FIG. 9C is a block diagram of a status report message with multiple sets of segment offset fields for negatively acknowledging the PDUs in the example of FIG. 9B according to some embodiments.

FIGS. 9A-9C illustrate one example in the context described previously. In this case, a transmitter segments an SDU with SN=X as shown in FIG. 9A so as to create PDUs 1-8 at segmentation points A-G. The transmitter sends the segments as PDUs 1-8 to the receiver but as shown in FIG. 9B the receiver receives only PDUs 1,4,6 and 8. The transmitter sets the poll-bit based on timer expiration or counter value, which exceeds the pre-configured value. This results in that the receiver must create a status report to be sent to the transmitter to indicate what parts needs to be re-transmitted. As shown in FIG. 9C, the receiver in this regard creates a status report block (namely, status report block 1) that indicates that all of the PDUs 2, 3, 5, and 7 are missing. In particular, the NACK_SN field 20 of the status report block is set to SN=X, and multiple different sets of SO fields 22 related to that same NACK_SN field 20 negatively acknowledge PDUs 2, 3, 5, and 7 as containing missing segments of the SDU with SN=X. One set of SO fields includes an SO_Start field set to segmentation point A and an SO_End field set to segmentation point C to negatively acknowledge both PDUs 2 and 3 which are consecutive PDUs. A different set of SO fields includes an SO_Start field set to segmentation point D and an SO_End field set to segmentation point E to negatively acknowledge PDU 5, and yet another set of SO fields includes an SO_Start field set to segmentation point F and an SO_End field set to segmentation point G to negatively acknowledge PDU 7.

Consider now embodiments regarding how the receiver indicates this type of format in which there are multiple SO-pairs related to the same NACK_SN field.

There are several methods to indicate this. As shown in FIG. 10, a combination of E2 and E3 bits may be used e.g. E2, E3=11. Alternatively, a combination of E1, E2 and E3 may be used e.g. (E1, E2, E3)=100 or 111.

Figure 11:
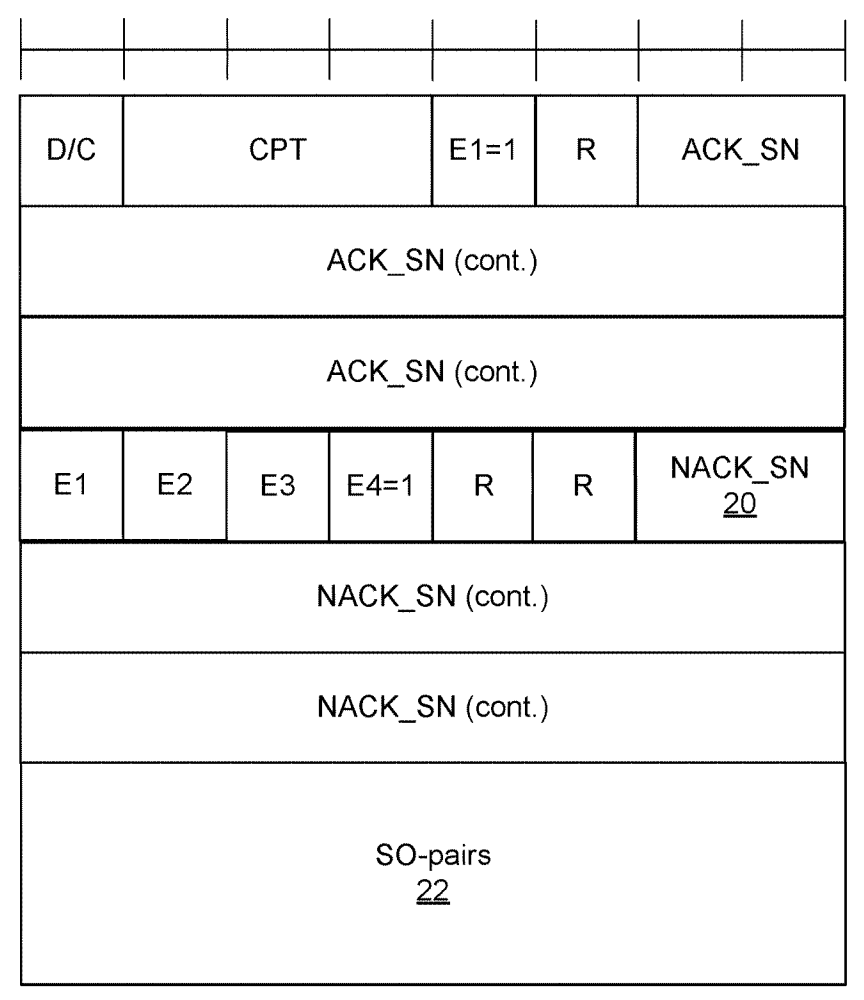

In still other embodiments, as shown in FIG. 11, a new bit, e.g. E4, may be used (for example, taken from the set of reserved bits, i.e. R-bit) to indicate the presence or absence of multiple SO pairs 22 related to the same NACK_SN field 20.

In yet other embodiments, a combination of any two or more E-bits (E1-E2-E3-E4) may be used for this.

Consider next embodiments for the status report block to indicate how many SO pairs there are in the block, or at least indicate if a second SO pair follows after a first SO pair. Different methods are exemplified below.

Figure 12:
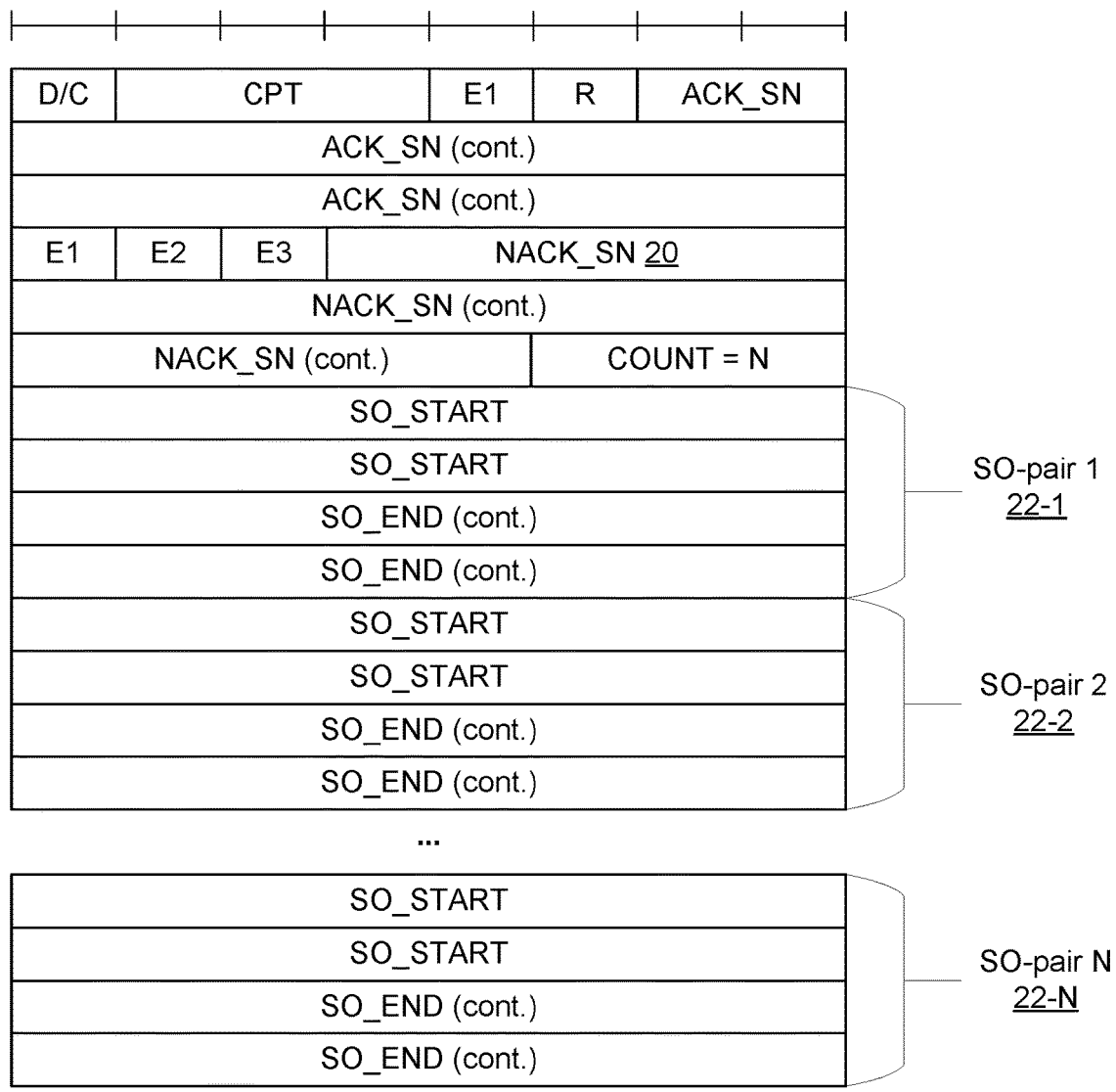
FIG. 12 is a block diagram of a status report message with a count field indicating multiple sets of segment offset fields according to some embodiments.

In one embodiment, a Count field with n bits is used, as shown in FIG. 12. This counter indicates how many SO pairs are included in the block. This field could be included in different parts of the block e.g. after the E bits, after the NACK_SN, after the first SO-pair (in which case the count could indicate the total of SO pairs or the total minus 1).

Figure 13:
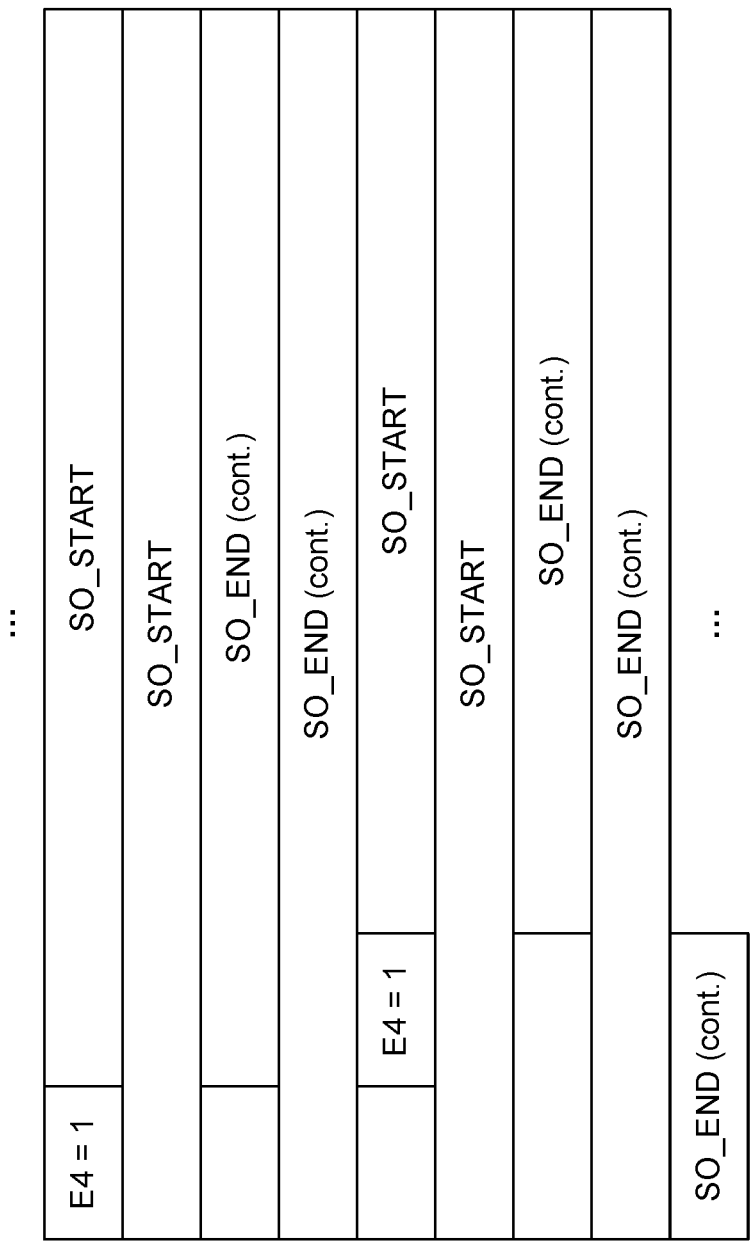
FIG. 13 is a block diagram of a status report message with an extension bit indicating multiple sets of segment offset fields according to some embodiments.
Figure 14:
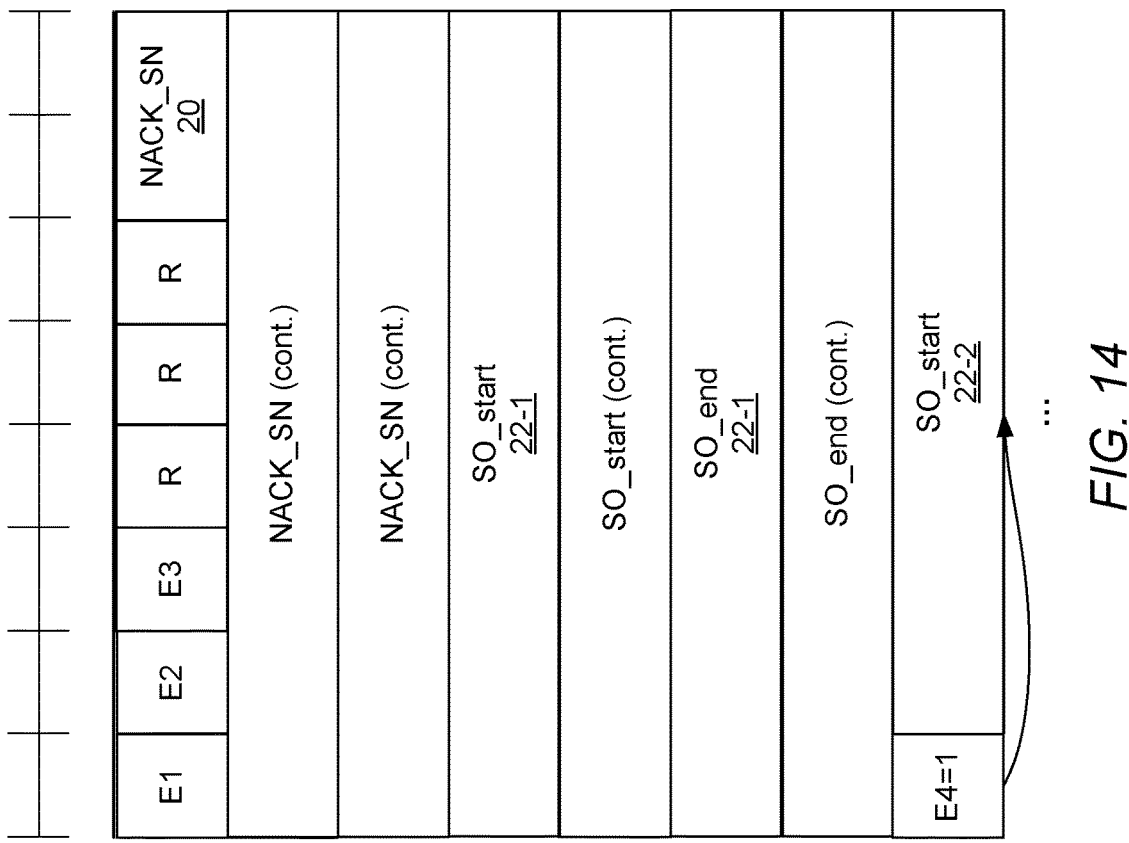
FIG. 14 is a block diagram of a status report message with an extension bit indicating multiple sets of segment offset fields according to other embodiments.

In another embodiment, a bit is used to indicate that a second SO pair follows a first SO pair. As shown in FIG. 13, the bit in some embodiments is placed after the NACK_SN field 20 and indicates if an E4 bit and SO pair 22 follows after the first SO-pair. Alternatively, as shown in FIG. 14, the E4 bit is indicated after each SO pair. When the E4 bit is set to 1, it means that an SO pair and E4 bit follows. No more SO pairs would then be indicated by an E4 bit set to 0.

Figure 15:
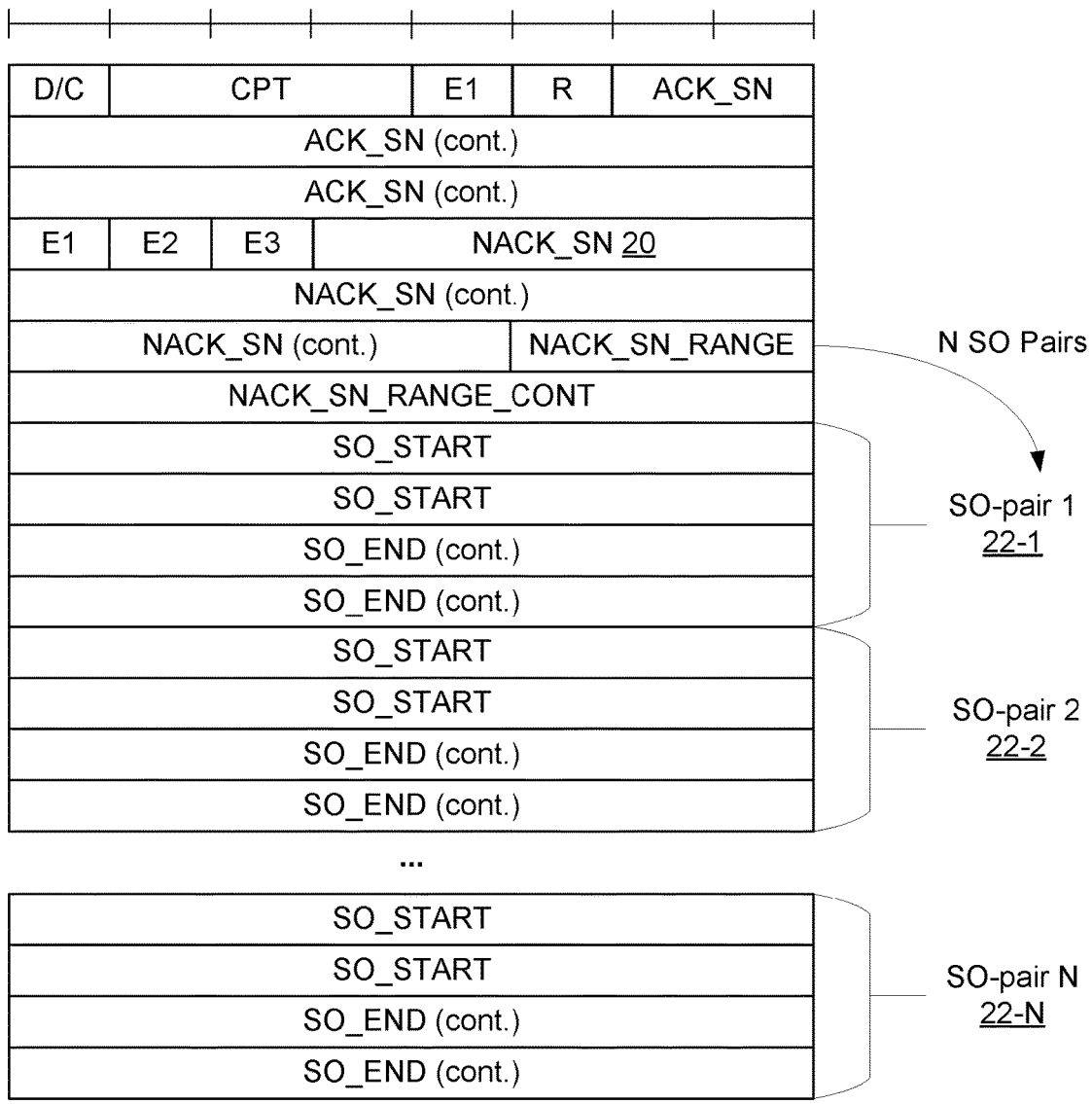
FIG. 15 is a block diagram of a status report message with a NACK SN Range field indicating multiple sets of segment offset fields according to other embodiments.

Still other embodiments use the NACK_SN_RANGE to indicate number of missing segments. In particular, the NACK_SN_RANGE field is interpreted in FIG. 15 as a count of SO pair fields 22 in the header. For example, if an SDU has 4 segments missing and if those segments are not next to each other, the NACK_SN_RANGE may be set to the value 4. The receiver parses the NACK_SN_RANGE and from the value 4 and (E2 and E3 bits set to '1'), it knows that 4 SO-pairs will follow. In the case where 4 segments are missing, but one segment is next to another, then in some embodiments the NACK_SN_RANGE may indicate value 3 because only 3 SO-pair values are needed. Accordingly, the NACK_SN_RANGE is interpreted differently, depending on the combination of the E-bits. i.e. the range is interpreted as a count.

Consider now other alternative or additional embodiments regarding an SO pair consisting of SO_START and SO_END fields. In some cases, as demonstrated in FIG. 9C, a status report format may have one SO pair that indicates that multiple PDUs are missing from the same SDU. This is possible when these PDUs carry consecutive segments. These embodiments for indicating multiple PDUs are missing using one SO pair may be used irrespective of whether any other SO pairs are related to the same NACK SN field.

Figure 16A:
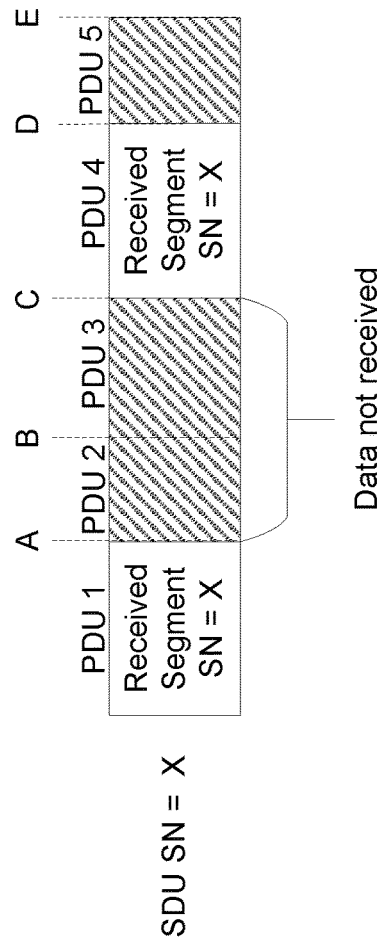
FIG. 16A is a block diagram of an SDU segmented according to an example, with certain PDUs missing.
Figure 16B:
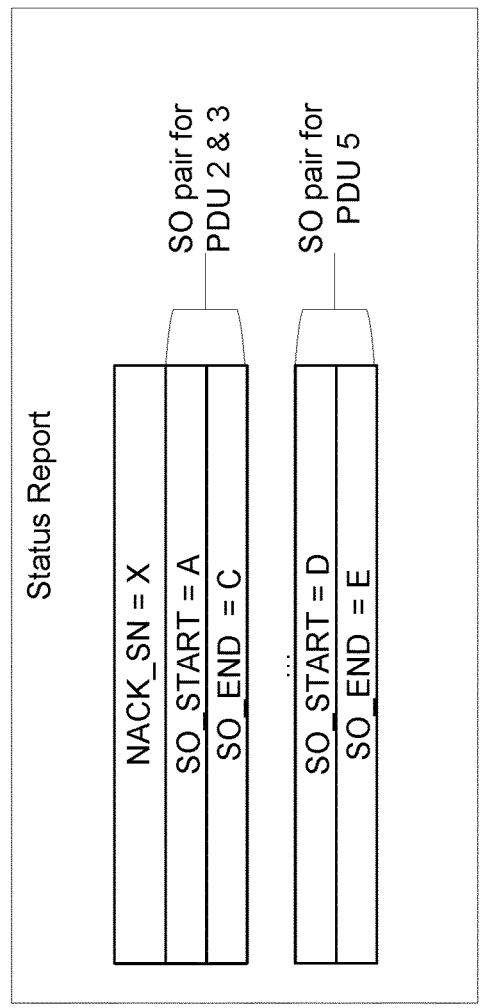
FIG. 16B is a block diagram of a status report message with multiple sets of segment offset fields for negatively acknowledging the PDUs in the example of FIG. 16A according to some embodiments.

Consider another example in FIGS. 16A-16C. As shown in FIG. 16A, an SDU with SN=X is segmented into 5 PDUs at segment points A-E. PDUs 2, 3, and 5 are not received, though. The status report block in some embodiments may indicate 3 SO pairs, with each of them indicating the respective SO_START and SO_END of a missing PDU. However, the status report block in other embodiments as shown in FIG. 16B reports only two SO pairs, including one SO pair for indicating PDUs 2 and 3 as missing, and one SO pair for indicating PDU 5 is missing. For the SO pair to indicate both PDUs 2 and 3 are missing, the SO_START field of the SO pair is set to the start of PDU 2 (i.e., segment point A) and the SO_END field of the SO pair is set to the end of PDU 3 i.e., segment point C).

Despite explanation in the context of NR in some embodiments, it will be appreciated that the techniques may be applied to other wireless networks, as well as to successors of NR. Thus, references herein to signals using terminology from the 3GPP standards should be understood to apply more generally to signals having similar characteristics and/or purposes, in other networks.

Radio equipment herein is any type of equipment configured for radio communication with other radio equipment. The radio equipment may for instance constitute radio network equipment (e.g., a base station) or user equipment (UE). Radio network equipment is any equipment capable of communicating with a user equipment over radio signals. Examples of radio network equipment include, but are not limited to, base stations (BSs), radio base stations, Node Bs, multi-standard radio (MSR) radio nodes such as MSR BSs, evolved Node Bs (eNBs), gNodeBs (gNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), etc.

A user equipment is any type device capable of communicating with radio network equipment over radio signals. A user equipment may therefore refer to a machine-to-machine (M2M) device, a machine-type communications (MTC) device, a NB-IoT device, etc. However it should be noted that the UE does not necessarily have a "user" in the sense of an individual person owning and/or operating the device. A user equipment may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

In view of the above modifications and variations, it will be appreciated that radio equipment 12 or 14 herein may be configured to perform the method 100 shown in FIG. 17A. As shown, the method 100 includes transmitting a status report message 18 that includes a negative acknowledgement (NACK) sequence number (SN) field 20 and multiple different sets 22 of segment offset (SO) fields related to the NACK SN field 20 (Block 102). As explained above, the different sets 22 of SO fields in some embodiments indicate different respective service data unit (SDU) portions that have been detected as lost. The different respective SDU portions are portions of the same SDU 16 with a SN indicated by the NACK SN field 20. As explained in the above context, some embodiments include radio equipment 12 transmitting the status report message 18 and radio equipment 14 receiving the status report message 18, whereas other embodiments include radio equipment 14 transmitting the status report message 18 and radio equipment 12 receiving the status report message 18.

In some embodiments, the method 100 further includes generating the status report message 18 (Block 104) (e.g., prior to transmitting the message in Block 102).

In some embodiments, the method 100 further includes detecting the different SDU portions as lost at the radio equipment, and performing said transmitting of the status report message 18 in response to said detecting. The status report message 18 in this regard may be transmitted directly in response to such detection (e.g., after detecting the different SDU portions as lost, without waiting for reception of additional SDUs) or indirectly in response to such detection (e.g., after detecting the different SDU portions as lost, as well as detecting whether one or more other SDUs are detected as lost in full or part).

In other embodiments, radio equipment 12 or 14 herein may be configured to perform the method 105 shown in FIG. 17B. As shown, the method 105 includes receiving a status report message 18 that includes a negative acknowledgement (NACK) sequence number (SN) field 20 and multiple different sets 22 of segment offset (SO) fields related to the NACK SN field 20 (Block 106). As explained above, the different sets 22 of SO fields in some embodiments indicate different respective service data unit (SDU) portions that have been detected as lost. The different respective SDU portions are portions of the same SDU 16 with a SN indicated by the NACK SN field 20. As explained in the above context, some embodiments include radio equipment 12 transmitting the status report message 18 and radio equipment 14 receiving the status report message 18, whereas other embodiments include radio equipment 14 transmitting the status report message 18 and radio equipment 12 receiving the status report message 18.

In some embodiments, the method 105 further includes parsing the status report message 18 (Block 108) (e.g., after receiving the message in Block 106).

In some embodiments, the method 105 may further include transmitting the different respective SDU portions in different respective protocol data units (PDUs) that each have a SN set to the SN of the SDU, and receiving the status report message 18 in response to transmitting at least some of the different respective SDU portions.

Alternatively or additionally, radio equipment 12 or 14 herein may be configured to perform the method 110 shown in FIG. 17C. As shown, the method includes transmitting a status report message that includes a negative acknowledgement (NACK) sequence number (SN) field and a set of segment offset (SO) fields related to the NACK SN field (Block 112). The set of SO fields indicates a service data unit (SDU) portion that has been detected as lost. The different consecutive sub-portions of the indicated SDU portion are carried by different respective protocol data units (PDUs) that each have a SN set to the SN of the SDU.

In some embodiments, the method 110 further includes generating the status report message (Block 114) (e.g., prior to transmitting the message in Block 112).

According to other embodiments, radio equipment 12 or 14 herein may be configured to perform the method 115 shown in FIG. 17D. As shown, the method includes receiving a status report message that includes a negative acknowledgement (NACK) sequence number (SN) field and a set of segment offset (SO) fields related to the NACK SN field (Block 116). The set of SO fields indicates a service data unit (SDU) portion that has been detected as lost. The different consecutive sub-portions of the indicated SDU portion are carried by different respective protocol data units (PDUs) that each have a SN set to the SN of the SDU.

In some embodiments, the method 115 further includes parsing the status report message (Block 118) (e.g., after receiving the message in Block 116).

Note that radio equipment 12 or 14 as described above may perform any of the processing herein by implementing any functional means or units. In one embodiment, for example, the radio equipment 12 or 14 comprises respective circuits or circuitry configured to perform the steps shown in any of FIGS. 17A-17D. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 18A:
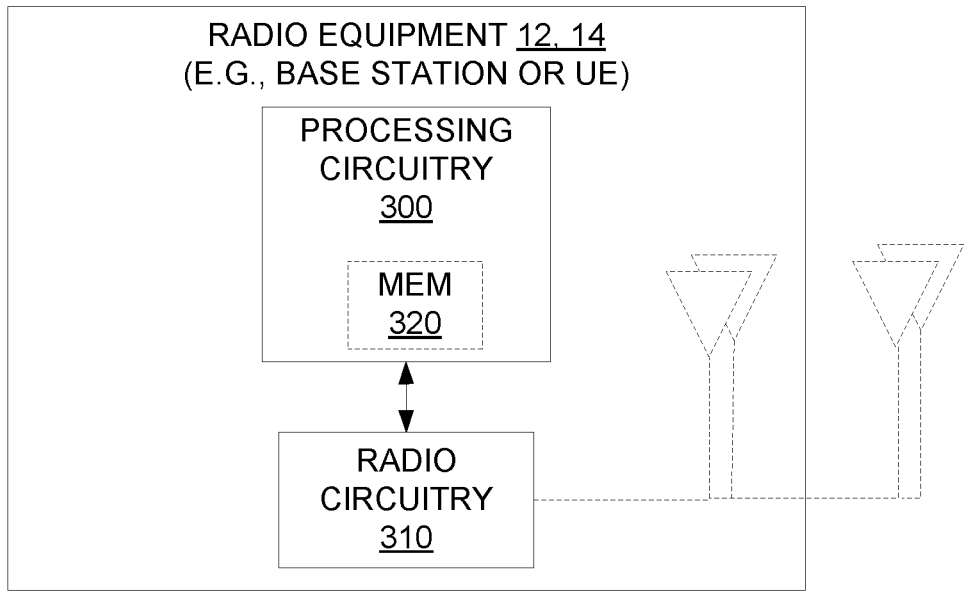
FIG. 18A is a block diagram of radio equipment according to some embodiments.

FIG. 18A illustrates radio equipment 12 or 14 in accordance with one or more embodiments. As shown, the radio equipment 12 or 14 includes processing circuitry 300 and radio circuitry 310. The radio circuitry 310 is configured to transmit and/or receive information to and/or from one or more other nodes, e.g., via any communication technology. The communication circuitry 310 may do so for instance via one or more antennas, which may be internal or external to the radio equipment 12 or 14. The processing circuitry 300 is configured to perform processing described above, e.g., in any of FIGS. 17A-17D, such as by executing instructions stored in memory 320. The processing circuitry 300 in this regard may implement certain functional means, units, or modules.

Figure 18B:
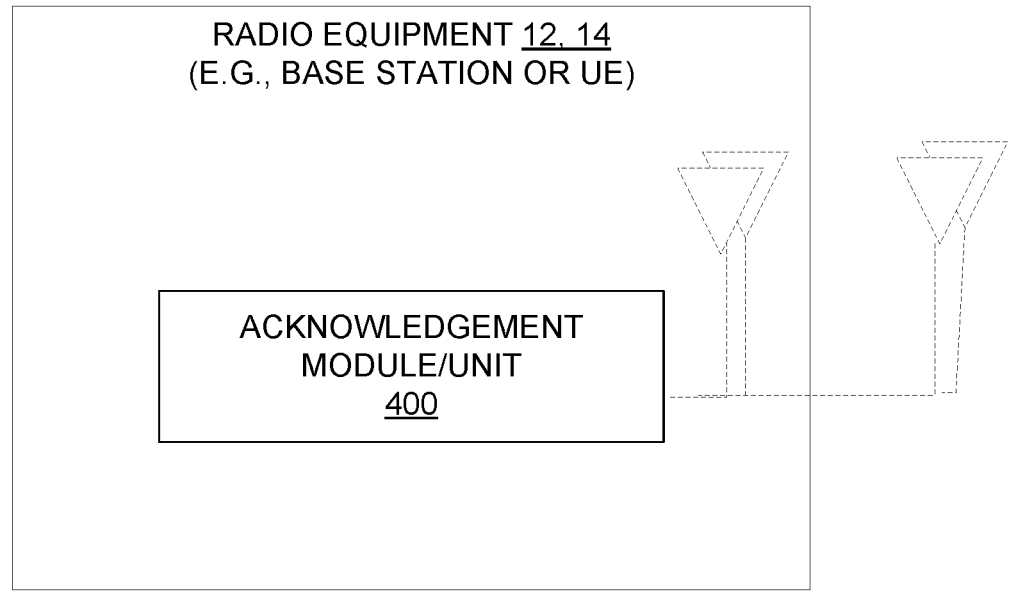
FIG. 18B is a block diagram of radio equipment according to other embodiments.

FIG. 18B illustrates radio equipment 12 or 14 in accordance with one or more other embodiments. As shown, the radio equipment 12 or 14 implements various functional means, units, or modules, e.g., via the processing circuitry 300 in FIG. 18A and/or via software code. These functional means, units, or modules, e.g., for implementing the method in any of FIGS. 17A-17B, include for instance an acknowledgment module or unit 400 for transmitting or receiving a status report message that includes a negative acknowledgement (NACK) sequence number (SN) field and multiple different sets of segment offset (SO) fields related to the NACK SN field. As explained above, the different sets of SO fields in some embodiments indicate different respective service data unit (SDU) portions that have been detected as lost. The different respective SDU portions are portions of the same SDU with a SN indicated by the NACK SN field.

Those skilled in the art will also appreciate that embodiments herein further include corresponding computer programs.

A computer program comprises instructions which, when executed on at least one processor of radio equipment 12 or 14, cause the radio equipment 12 or 14 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of radio equipment 12 or 14, cause the radio equipment 12 or 14 to perform as described above.

Embodiments further include a computer program product comprising program code portions for performing the steps of any of the embodiments herein when the computer program product is executed by radio equipment 12 or 14. This computer program product may be stored on a computer readable recording medium.

Figure 19:
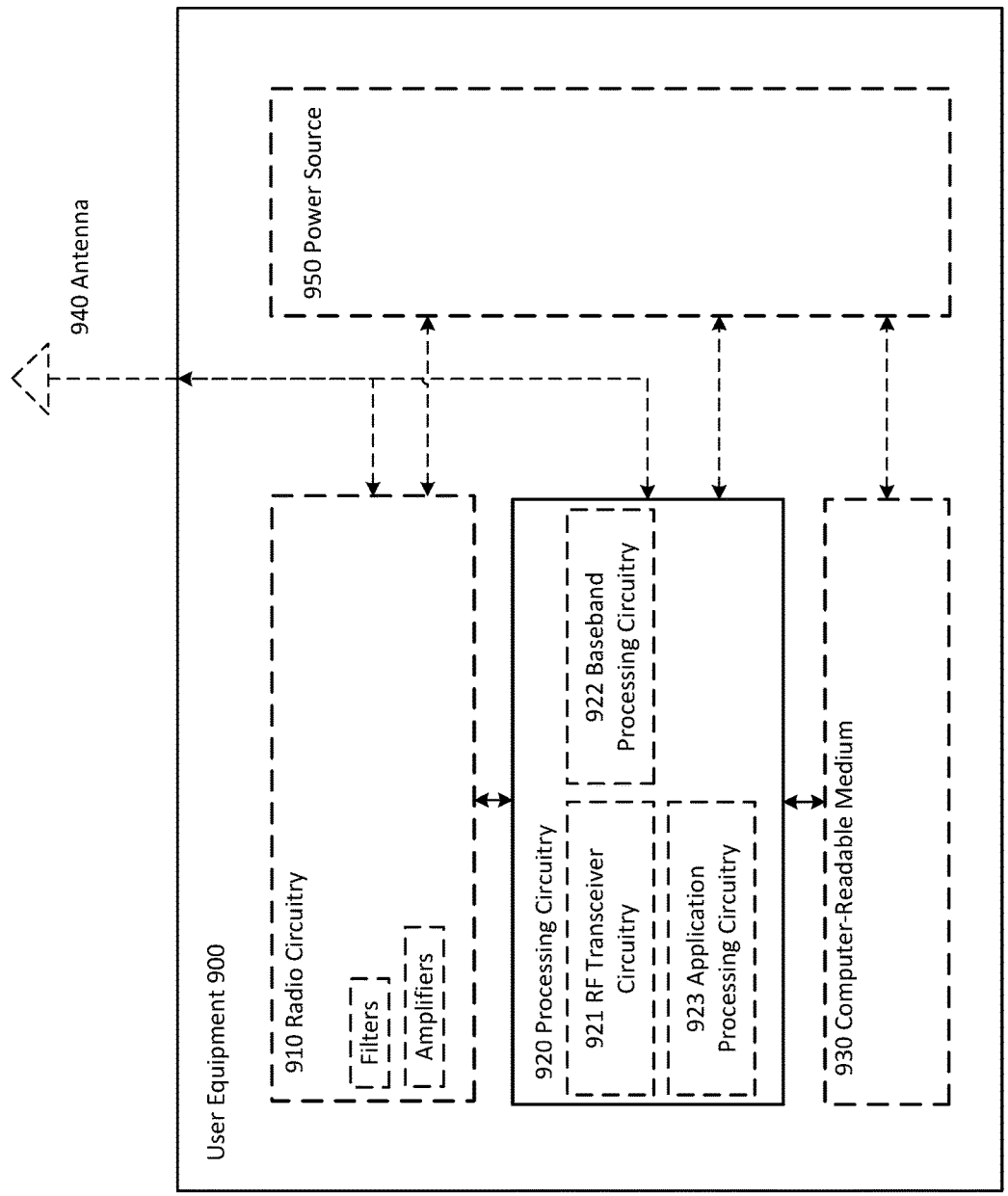
FIG. 19 is a block diagram of a user equipment according to some embodiments.

Additional details of a user equipment 900 are shown in relation to FIG. 19. As shown, the example user equipment 900 includes an antenna 940, radio circuitry (e.g. radio front-end circuitry) 910, processing circuitry 920, and the user equipment 900 may also include a memory 930. The memory 930 may be separate from the processing circuitry 920 or an integral part of processing circuitry 920. Antenna 940 may include one or more antennas or antenna arrays, and is configured to send and/or receive wireless signals, and is connected to radio circuitry (e.g. radio front-end circuitry) 910. In certain alternative embodiments, user equipment 900 may not include antenna 940, and antenna 940 may instead be separate from user equipment 900 and be connectable to user equipment 900 through an interface or port.

The radio circuitry (e.g. radio front-end circuitry) 910 may comprise various filters and amplifiers, is connected to antenna 940 and processing circuitry 920, and is configured to condition signals communicated between antenna 940 and processing circuitry 920. In certain alternative embodiments, user equipment 900 may not include radio circuitry (e.g. radio front-end circuitry) 910, and processing circuitry 920 may instead be connected to antenna 940 without front-end circuitry 910.

Processing circuitry 920 may include one or more of radio frequency (RF) transceiver circuitry, baseband processing circuitry, and application processing circuitry. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

The user equipment 900 may include a power source 950. The power source 950 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 910, processing circuitry 920, and/or memory 930. The power source 950, battery, power supply circuitry, and/or power management circuitry are configured to supply user equipment 900, including processing circuitry 920, with power for performing the functionality described herein.

Figure 20:
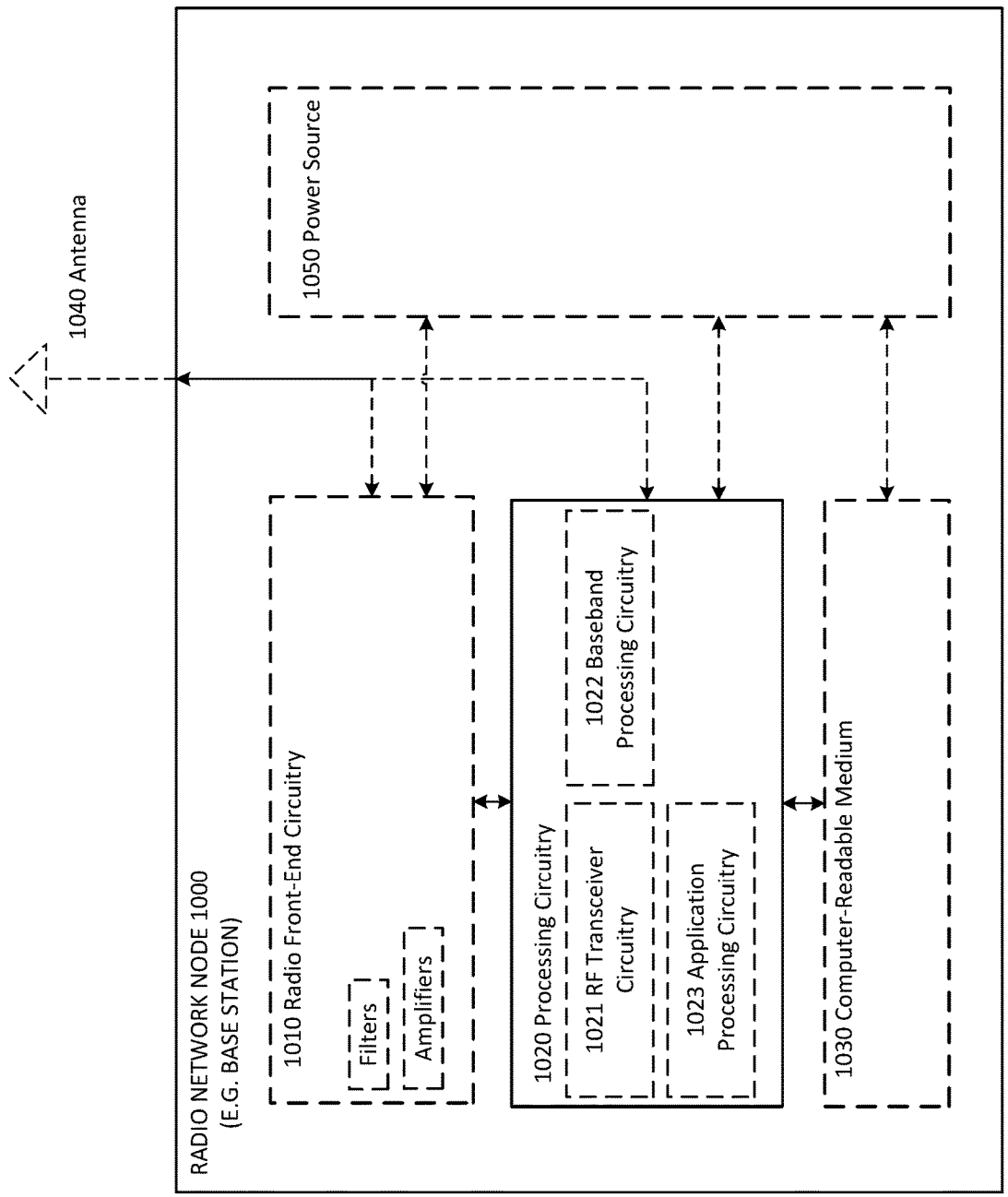
FIG. 20 is a block diagram of radio network equipment according to some embodiments.

Additional details of the radio network node 1000 are shown in relation to FIG. 20. As shown, the example radio network node 1000 includes an antenna 1040, radio circuitry (e.g. radio front-end circuitry) 1010, processing circuitry 1020, and the radio network node 12 may also include a memory 1030. The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g. radio front-end circuitry) 1010. In certain alternative embodiments, radio network node 1000 may not include antenna 1040, and antenna 1040 may instead be separate from radio network node 12 and be connectable to radio network node 1000 through an interface or port.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, radio network node 1000 may not include radio circuitry (e.g. radio front-end circuitry) 1010, and processing circuitry 1020 may instead be connected to antenna 1040 without front-end circuitry 1010.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The radio network node 1000 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply radio network node 1000, including processing circuitry 1020, with power for performing the functionality described herein.

The example aspects of the disclosure presented below may be included in and/or may add features to one or more embodiments presented in the disclosure above. In some cases, the example aspects of the disclosure presented below form aspects of one or more embodiments that are at least partially distinct from the one or more embodiments presented above.

Figure 21:
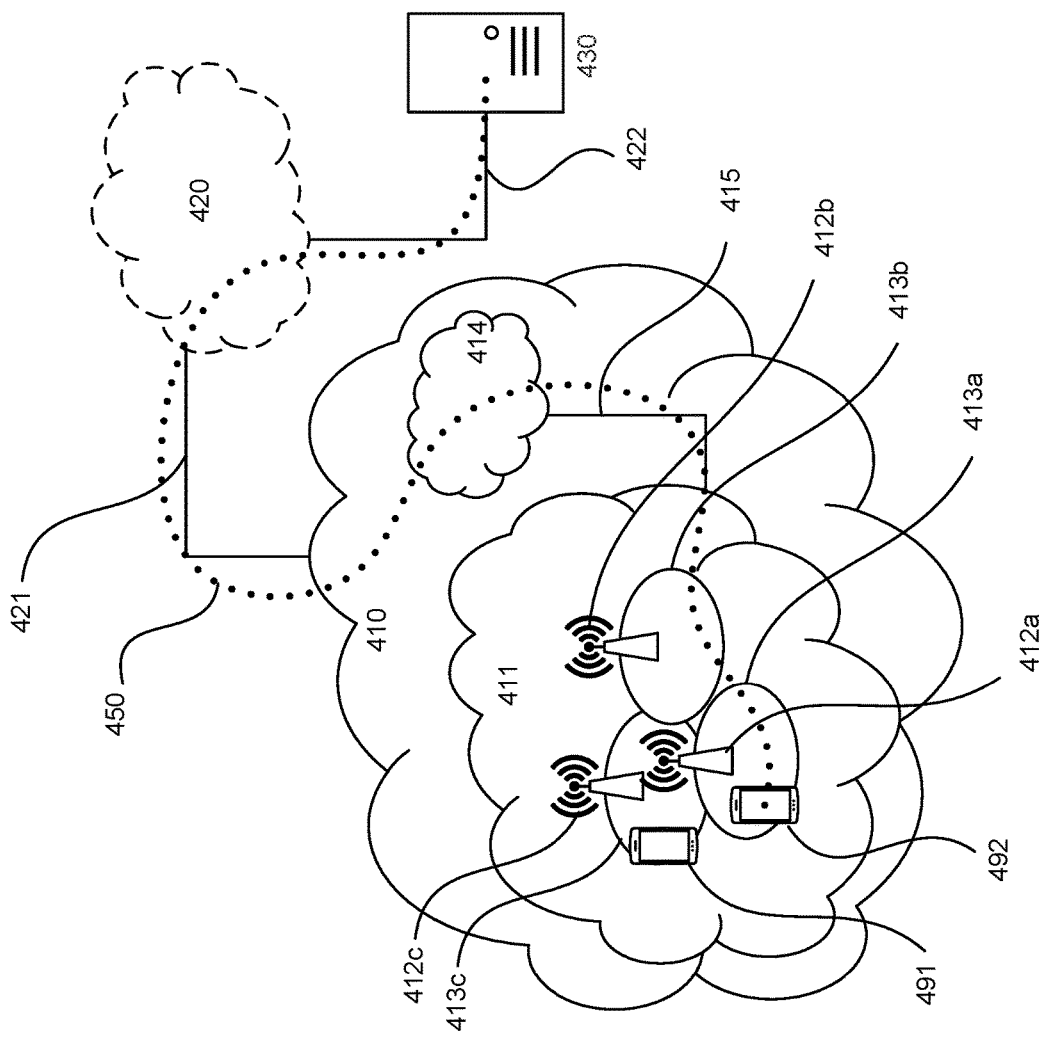
FIG. 21 is a block diagram of a telecommunication network connected via an intermediate network to a host computer in accordance with some embodiments.

FIG. 21 illustrates a telecommunication network connected via an intermediate network to a host computer in accordance with some embodiments. In particular, with reference to FIG. 21, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 21 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 22:
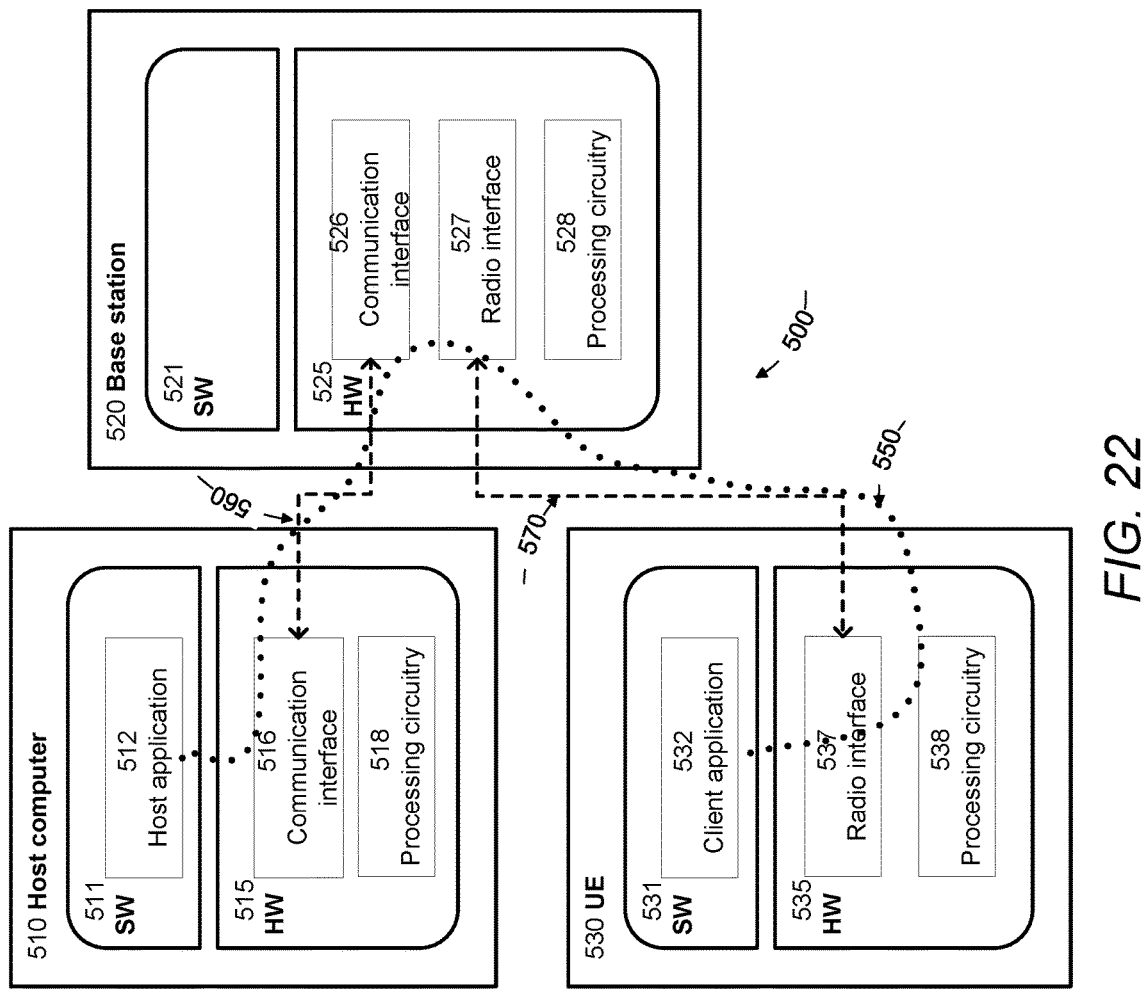
FIG. 22 is a block diagram of a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. FIG. 22 illustrates host computer communicating via a base station with a user equipment over a partially wireless connection in accordance with some embodiments. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 22) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 22 may be similar or identical to host computer 430, one of base stations 412a, 412b, 412c and one of UEs 491, 492 of FIG. 21, respectively. This is to say, the inner workings of these entities may be as shown in FIG. 22 and independently, the surrounding network topology may be that of FIG. 21.

In FIG. 22, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments can improve one or more of data rate, latency, and/or power consumption associated with one or more devices and/or communications of/performed in the communication system, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 23:
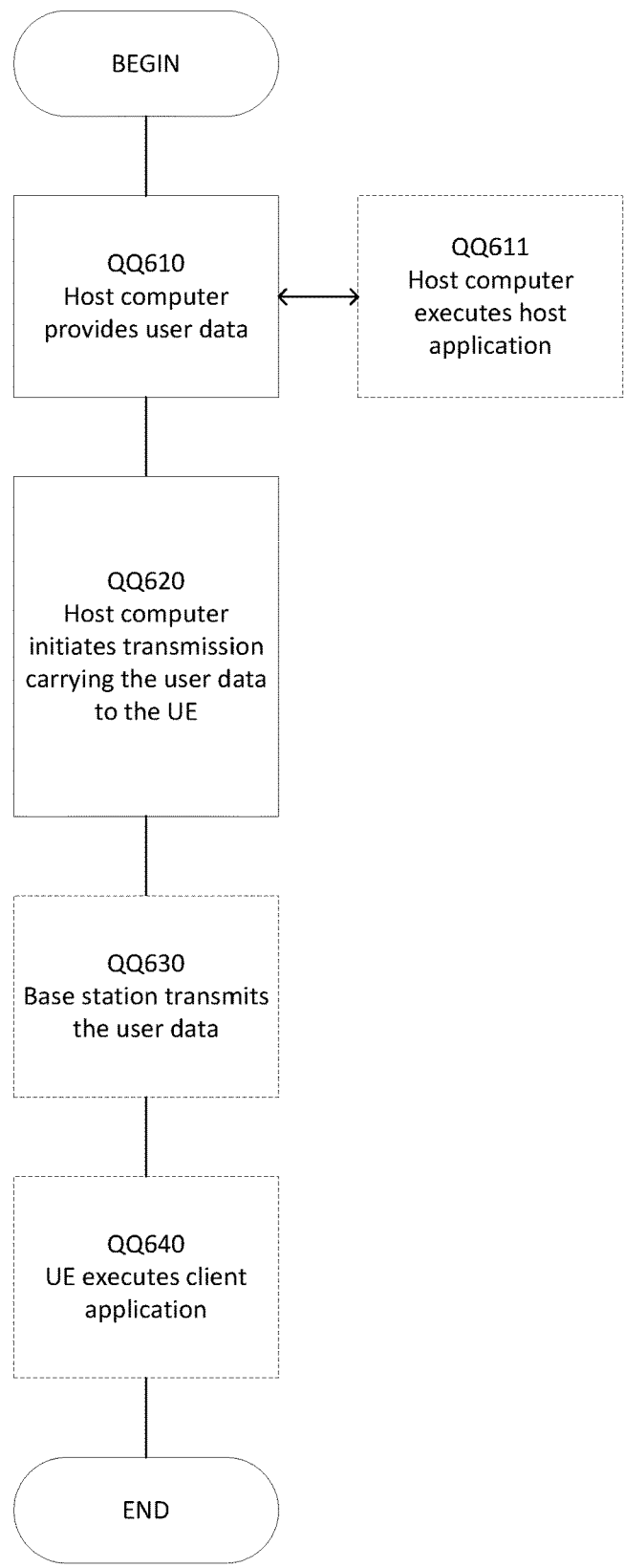
FIG. 23 is a logic flow diagram of a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 24:
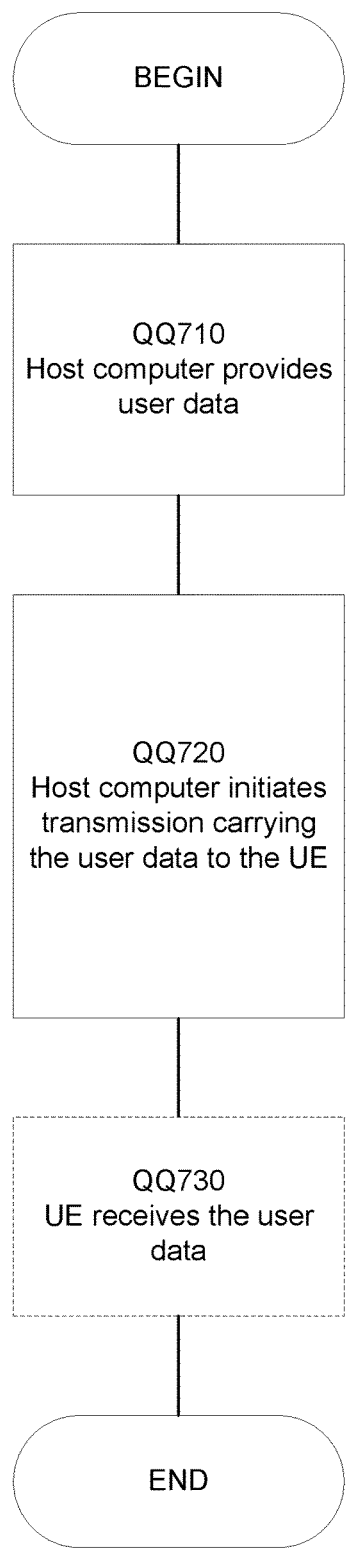
FIG. 24 is a logic flow diagram of a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 25:
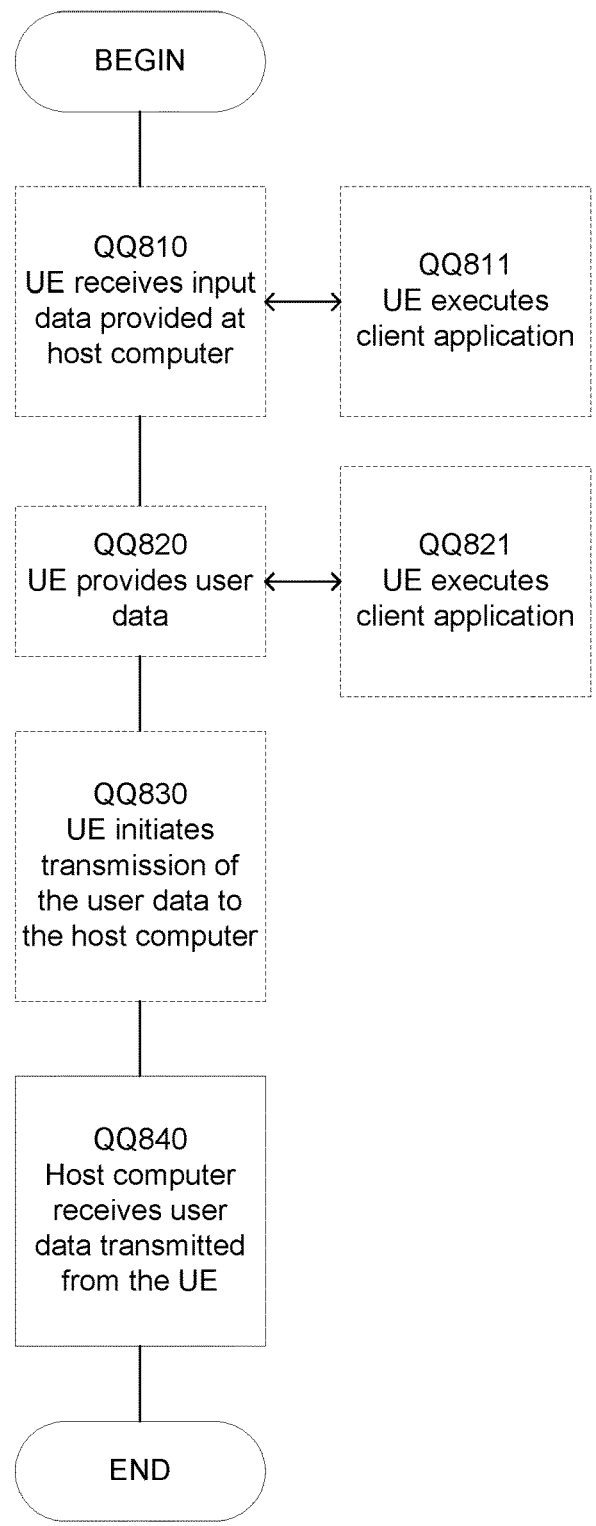
FIG. 25 is a logic flow diagram of a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 26:
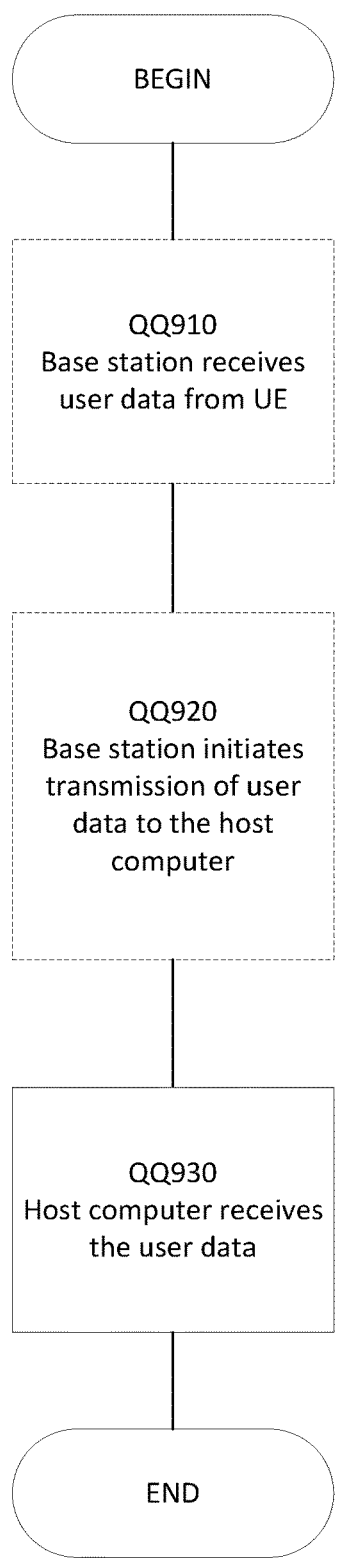
FIG. 26 is a logic flow diagram of a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, embodiments herein include a base station configured to communicate with a user equipment (UE), the base station comprising a radio interface and processing circuitry configured to perform aspects of example embodiments described throughout the present disclosure.

Embodiments also include a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform aspects of example embodiments described throughout the present disclosure, including aspects related to forwarding the user data to the UE. In some embodiments, the communication system further includes the base station. Alternatively or additionally, the communication system may include the UE wherein the UE is configured to communicate with the base station.

In some embodiments, the processing circuitry of the host computer is configured to execute a host application, thereby providing the user data; and the UE comprises processing circuitry configured to execute a client application associated with the host application.

Embodiments further include a method implemented in a base station, comprising aspects of example embodiments described throughout the present disclosure, including aspects related to transmitting user data to a UE.

Embodiments also include a method implemented in a communication system including a host computer, a base station and a user equipment (UE), the method comprising: at the host computer, providing user data; and at the host computer, initiating a transmission carrying the user data to the UE via a cellular network comprising the base station, wherein the base station is configured to perform aspects of example embodiments described throughout the present disclosure, included aspects related to transmitting the user data to the UE. In some embodiments, the method further comprises, at the base station, transmitting the user data. In some embodiments wherein the user data is provided at the host computer by executing a host application, the method further comprises, at the UE, executing a client application associated with the host application.

Embodiments also include a user equipment (UE) configured to communicate with a base station, the UE comprising a radio interface and processing circuitry configured to perform aspects of example embodiments described throughout the present disclosure, including aspects related to receiving user data from the base station.

Embodiments further include a communication system including a host computer comprising: processing circuitry configured to provide user data; and a communication interface configured to forward user data to a cellular network for transmission to a user equipment (UE), wherein the UE comprises a radio interface and processing circuitry, the UE's processing circuitry configured to perform aspects of example embodiments described throughout the present disclosure, including aspects related to the UE receiving the user data from the base station. In some embodiments, the communication system further includes the UE. In some embodiments the cellular network further includes a base station configured to communicate with the UE. In some embodiments, the processing circuitry of the host computer is configured to execute a host application, thereby providing the user data; and the UE's processing circuitry is configured to execute a client application associated with the host application.

Embodiments also include a method implemented in a user equipment (UE), comprising aspects of example embodiments described throughout the present disclosure, including aspects related to the UE receiving user data from a base station.

Embodiments also include a method implemented in a communication system including a host computer, a base station and a user equipment (UE), the method comprising at the host computer, providing user data; and at the host computer, initiating a transmission carrying the user data to the UE via a cellular network comprising the base station, wherein the UE is configured to perform aspects of example embodiments described throughout the present disclosure, including aspects related to the UE receiving the user data from the base station. In some embodiments, the method further comprises, at the UE, receiving the user data from the base station.

Embodiments also include a user equipment (UE) configured to communicate with a base station, the UE comprising a radio interface and processing circuitry configured to perform aspects of example embodiments described throughout the present disclosure, including aspects related to the UE transmitting user data to the base station.

Embodiments further include a communication system including a host computer comprising: a communication interface configured to receive user data originating from a transmission from a user equipment (UE) to a base station, wherein the UE comprises a radio interface and processing circuitry, the UE's processing circuitry configured to perform aspects of example embodiments described throughout the present disclosure, including aspects related to the UE transmitting user data to the base station. In some embodiments, the communication system further includes the UE. In some embodiments, the communication system further includes the base station, wherein the base station comprises a radio interface configured to communicate with the UE and a communication interface configured to forward to the host computer the user data carried by a transmission from the UE to the base station. In some embodiments, the processing circuitry of the host computer is configured to execute a host application; and the UE's processing circuitry is configured to execute a client application associated with the host application, thereby providing the user data. Alternatively or additionally, the processing circuitry of the host computer is configured to execute a host application, thereby providing request data; and the UE's processing circuitry is configured to execute a client application associated with the host application, thereby providing the user data in response to the request data.

Embodiments also include a method implemented in a user equipment (UE), comprising aspects of example embodiments described throughout the present disclosure, including aspects related to the UE transmitting user data to a base station. In some embodiments, the method further comprises providing user data; and forwarding the user data to a host computer via the transmission to the base station.

Embodiments further include a method implemented in a communication system including a host computer, a base station and a user equipment (UE), the method comprising: at the host computer, receiving user data transmitted to the base station from the UE, wherein the UE is configured to perform aspects of example embodiments described throughout the present disclosure, including aspects related to the UE transmitting user data to the base station. In some embodiments, the method further comprises, at the UE, providing the user data to the base station. In some embodiments, the method further comprises, at the UE, executing a client application, thereby providing the user data to be transmitted; and at the host computer, executing a host application associated with the client application. In some embodiments, the method further comprises, at the UE, executing a client application; and, at the UE, receiving input data to the client application, the input data being provided at the host computer by executing a host application associated with the client application, wherein the user data to be transmitted is provided by the client application in response to the input data.

Embodiments also include a base station configured to communicate with a user equipment (UE), the base station comprising a radio interface and processing circuitry configured to perform aspects of example embodiments described throughout the present disclosure, including aspects related to the base station receiving user data from the UE.

Embodiments further include a communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE. In some embodiments, the communication system further includes the base station. In some embodiments, the communication system further includes the UE, wherein the UE is configured to communicate with the base station. In some embodiments, the processing circuitry of the host computer is configured to execute a host application; the UE is configured to execute a client application associated with the host application, thereby providing the user data to be received by the host computer.

Embodiments also include a method implemented in a base station, comprising perform aspects of example embodiments described throughout the present disclosure, including aspects related to the base station receiving user data from a user equipment (UE).

Embodiments further include a method implemented in a communication system including a host computer, a base station and a user equipment (UE), the method comprising: at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station. In some embodiments, the method further includes, at the base station, receiving the user data from the UE. In some embodiments, the method further includes, at the base station, initiating a transmission of the received user data to the host computer.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by radio equipment configured for use in a wireless communication system, the method comprising:
   transmitting or receiving a status report message that includes a negative acknowledgement, NACK, sequence number, SN, field and multiple different sets of segment offset, SO, fields related to the NACK SN field, wherein the different sets of SO fields indicate different respective service data unit, SDU, portions that have been detected as lost, wherein the different respective SDU portions are portions of the same SDU with a SN indicated by the NACK SN field.

2. The method of claim 1, further comprising detecting the different SDU portions as lost at the radio equipment, and performing said transmitting of the status report message in response to said detecting.

3. The method of claim 1, further comprising transmitting the different respective SDU portions in different respective protocol data units, PDUs, that each have a SN set to the SN of the SDU, and receiving the status report message in response to transmitting at least some of the different respective SDU portions.

4. The method of claim 1, wherein the status report message is configurable to include one status report block per SDU to be negatively acknowledged by the status report message, in whole or in part, such that different status report blocks negatively acknowledge different SDUs.

5. The method of claim 1, wherein the NACK SN field and the multiple different sets of SO fields related to the NACK SN field are included in the same status report block.

6. The method of claim 1, wherein the status report message further includes a count field indicating how many sets of SO fields are related to the NACK SN field.

7. The method of claim 1, wherein the status report message further includes an extension bit before each set of SO fields indicating whether or not another set of SO fields is included in the status report message after that set of SO fields.

8. The method of claim 1, wherein the status report message further includes an extension bit after each set of SO fields indicating whether or not another set of SO fields is included in the status report message after that set of SO fields.

9. The method of claim 1, wherein the status report message further includes a NACK range field, wherein according to a first possible format of the status report message the NACK range field indicates a number of consecutively lost SDUs starting from and including an SDU indicated by the NACK SN field, and wherein according to a second possible format of the status report message the NACK range field indicates a number of sets of SO fields related to the NACK SN field.

10. The method of claim 1, wherein the status report message further includes a set of one or more extension bits that indicates the status report message includes multiple different sets of SO fields related to the NACK SN field.

11. The method of claim 1, wherein, for at least one of the sets of SO fields, different sub-portions of the SDU portion indicated by that set of SO fields are carried by different respective protocol data units, PDUs, that each have a SN set to the SN of the SDU.

12. Radio equipment configured for use in a wireless communication system, the radio equipment comprising:
   radio circuitry; and
   processing circuitry configured to transmit or receive, via the radio circuitry, a status report message that includes a negative acknowledgement, NACK, sequence number, SN, field and multiple different sets of segment offset, SO, fields related to the NACK SN field, wherein the different sets of SO fields indicate different respective service data unit, SDU, portions that have been detected as lost, wherein the different respective SDU portions are portions of the same SDU with a SN indicated by the NACK SN field.

13. The radio equipment of claim 12, the processing circuitry configured to detect the different SDU portions as lost at the radio equipment, and transmit, via the radio circuitry, the status report message in response to said detecting.

14. The radio equipment of claim 12, the processing circuitry configured to transmit, via the radio circuitry, the different respective SDU portions in different respective protocol data units, PDUs, that each have a SN set to the SN of the SDU, and receive, via the radio circuitry, the status report message in response to transmitting at least some of the different respective SDU portions.

15. The radio equipment of claim 12, wherein the status report message is configurable to include one status report block per SDU to be negatively acknowledged, in whole or in part, by the status report message, such that different status report blocks negatively acknowledge different SDUs.

16. The radio equipment of claim 12, wherein the NACK SN field and the multiple different sets of SO fields related to the NACK SN field are included in the same status report block.

17. The radio equipment of claim 12, wherein the status report message further includes a count field indicating how many sets of SO fields are related to the NACK SN field.

18. The radio equipment of claim 12, wherein the status report message further includes an extension bit before each set of SO fields indicating whether or not another set of SO fields is included in the status report message after that set of SO fields.

19. The radio equipment of claim 12, wherein the status report message further includes an extension bit after each set of SO fields indicating whether or not another set of SO fields is included in the status report message after that set of SO fields.

20. The radio equipment of claim 12, wherein the status report message further includes a NACK range field, wherein according to a first possible format of the status report message the NACK range field indicates a number of consecutively lost SDUs starting from and including an SDU indicated by the NACK SN field, and wherein according to a second possible format of the status report message the NACK range field indicates a number of sets of SO fields related to the NACK SN field.

21. The radio equipment of claim 12, wherein the status report message further includes a set of one or more extension bits that indicates the status report message includes multiple different sets of SO fields related to the NACK SN field.

22. The radio equipment of claim 12, wherein, for at least one of the sets of SO fields, different sub-portions of the SDU portion indicated by that set of SO fields are carried by different respective protocol data units, PDUs, that each have a SN set to the SN of the SDU.

23. The radio equipment of claim 12, wherein the status report message is a radio link control, RLC, status report, and the SDU is a RLC SDU.

24. The radio equipment of claim 12, wherein the radio equipment is a user equipment.

25. The radio equipment of claim 12, wherein the radio equipment is radio network equipment.

26. A non-transitory computer readable storage medium having stored thereon a computer program comprising instructions which, when executed by at least one processor of radio equipment, causes the radio equipment to transmit or receive a status report message that includes a negative acknowledgement, NACK, sequence number, SN, field and multiple different sets of segment offset, SO, fields related to the NACK SN field, wherein the different sets of SO fields indicate different respective service data unit, SDU, portions that have been detected as lost, wherein the different respective SDU portions are portions of the same SDU with a SN indicated by the NACK SN field.

* * * * *